United States Patent
Matsuoka et al.

(10) Patent No.: US 11,306,203 B2
(45) Date of Patent: Apr. 19, 2022

(54) RUBBER-CONTAINING GRAFT POLYMER, RESIN COMPOSITION CONTAINING RUBBER-CONTAINING GRAFT POLYMER, AND SHAPED ARTICLE THEREOF

(71) Applicant: Mitsubishi Chemical Corporation, Tokyo (JP)

(72) Inventors: Shinji Matsuoka, Tokyo (JP); Naotaka Suenaga, Tokyo (JP); Saki Fujita, Tokyo (JP); Masashi Iimori, Tokyo (JP); Yuuta Maenaka, Tokyo (JP); Misaki Hagi, Tokyo (JP); Hiroya Arai, Tokyo (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 16/818,306

(22) Filed: Mar. 13, 2020

(65) Prior Publication Data

US 2020/0216664 A1  Jul. 9, 2020

Related U.S. Application Data

(63) Continuation of application No. PCT/JP2018/037020, filed on Oct. 3, 2018.

(30) Foreign Application Priority Data

Oct. 4, 2017  (JP) .............................. JP2017-193934

(51) Int. Cl.
*C08L 69/00* (2006.01)
*C08F 265/06* (2006.01)

(52) U.S. Cl.
CPC ............ *C08L 69/00* (2013.01); *C08F 265/06* (2013.01); *C08L 2205/14* (2013.01)

(58) Field of Classification Search
CPC .... C08F 285/00; C08F 265/06; C08F 283/12; C08L 51/04; C08L 51/003; C08L 51/085
See application file for complete search history.

(56) References Cited

U.S. PATENT DOCUMENTS

| | | | |
|---|---|---|---|
| 4,035,443 A | 7/1977 | Ide et al. | |
| 4,657,976 A * | 4/1987 | Ott .......................... | C08L 27/06 525/190 |
| 5,994,464 A * | 11/1999 | Ohsawa ..................... | C09J 4/00 525/85 |
| 9,486,752 B2 | 11/2016 | Haroun et al. | |
| 2002/0147246 A1* | 10/2002 | Takai ....................... | C08L 51/04 521/53 |
| 2005/0239962 A1* | 10/2005 | Yoo ........................ | C08F 279/02 525/71 |
| 2006/0074196 A1 | 4/2006 | Lewandowski et al. | |
| 2010/0249325 A1 | 9/2010 | Bothe et al. | |
| 2014/0147660 A1* | 5/2014 | Miyahira ................ | C08L 51/04 428/327 |

FOREIGN PATENT DOCUMENTS

| | | |
|---|---|---|
| EP | 2660256 A1 | 11/2013 |
| EP | 3034532 A2 | 6/2016 |
| JP | 51-082339 A | 7/1976 |
| JP | H03-050212 A | 3/1991 |
| JP | H04-059853 A | 2/1992 |
| JP | H11-292940 A | 10/1999 |
| JP | 2002-284952 A | 10/2002 |
| JP | 2008-514782 A | 5/2008 |
| WO | 2013/064756 A1 | 5/2013 |

OTHER PUBLICATIONS

International Search Report issued in corresponding International Patent Application No. PCT/JP2018/037020, dated Jan. 8, 2019.
Partial Supplementary European Search Report issued in corresponding European Patent Application No. 18864766.3 dated Oct. 15, 2020.
Extended Search Report issued in corresponding European Patent Application No. 18864766.3 dated Feb. 1, 2021.
Office Action issued in corresponding Japanese Patent Application No. 2019-546754 dated Feb. 2, 2021.
Office Action issued in Korean Patent Application No. 10-2020-7007967 dated Mar. 15, 2021.

* cited by examiner

*Primary Examiner* — Jeffrey C Mullis
(74) *Attorney, Agent, or Firm* — Morgan, Lewis & Bockius LLP

(57) ABSTRACT

Provided is a rubber-containing graft polymer that can be uniformly dispersed in a thermoplastic resin containing an alloy in a particle size of 100 to 300 nm and can improve strength developability required as a rubber-containing graft polymer. In a rubber-containing graft polymer (A) of the present invention, a rubber to be grafted has a particle size of 100 to 300 nm, a content of an organic solvent insoluble component in the rubber-containing graft polymer (100% by mass) is 92% to 99.5% by mass, and an organic solvent soluble component of the rubber-containing graft polymer has a weight average molecular weight of 250,000 to 700,000.

14 Claims, 4 Drawing Sheets

EXAMPLE 1 COMPARATIVE EXAMPLE 3

NEAR GATE

END PORTION

COMPARATIVE EXAMPLE 1

EXAMPLE 1

END PORTION

RUBBER-CONTAINING GRAFT POLYMER, RESIN COMPOSITION CONTAINING RUBBER-CONTAINING GRAFT POLYMER, AND SHAPED ARTICLE THEREOF

This application is a continuation application of International Application No. PCT/JP2018/037020, filed on Oct. 3, 2018, which claims the benefit of priority of the prior Japanese Patent Application No. 2017-193934, filed on Oct. 4, 2017, the content of which is incorporated herein by reference.

TECHNICAL FIELD

The present invention relates to a rubber-containing graft polymer, a resin composition containing a rubber-containing graft polymer, and a shaped article thereof.

BACKGROUND ART

A rubber-containing graft polymer is obtained by graft polymerization of a vinyl monomer to a rubbery polymer. The rubber-containing graft polymer is produced by emulsion polymerization, and can be dispersed in various resins while maintaining a predetermined rubber particle size and a rubber structure. Therefore, the rubber-containing graft polymer is suitably used for a resin that is required to have impact strength.

In order to improve the impact strength of the resin, it is generally known that it is better to uniformly disperse rubber in the resin. However, the rubber itself has low compatibility with general thermoplastic resins, and it is difficult to uniformly disperse the rubber alone in the resin.

In order to improve dispersibility of the rubber in the resin, it is known that a vinyl monomer is graft-polymerized to a rubbery polymer, and methyl methacrylate is suitably used as the vinyl monomer. The reason is, for example, that the methyl methacrylate is highly compatible with a wide range of thermoplastic resins such as polycarbonate, styrene-based resin, polyvinyl chloride resin, and polyester resin.

Patent Document 1 discloses an example in which a rubber-containing graft polymer obtained by graft polymerization of a vinyl monomer containing methyl methacrylate as a main component to a butadiene rubber is blended into polycarbonate.

Since this rubber graft polymer is produced by a production method including redox polymerization with an iron compound, the graft chain becomes short. Therefore, dispersibility in a polycarbonate resin-based resin is not sufficient. In particular, the polycarbonate (PC) resin is used for alloying and developing styrene acrylonitrile (SAN)-based resin compositions such as ABS resin, in many cases. In these cases, there are problems that, in methyl methacrylate having a short graft chain, dispersibility of rubber in an alloy becomes poor, weld strength is low, and dependency on shaping processing is high.

Patent Document 2 discloses a rubber-containing graft polymer obtained by graft polymerization of a vinyl monomer containing methyl methacrylate as a main component to an acrylic rubber.

These are produced by polymerization by a persulfate, without using a production method including redox polymerization by an iron compound. Therefore, it is a disclosure of an example in which there is a possibility that the graft chain can be lengthened, but a particle size is larger than 300 nm. In addition, the resin into which the rubber is blended is an epoxy-based thermosetting resin. In practice, in many thermoplastic resins, the particle size of the rubber dispersed in the resin is suitably 100 to 300 nm.

CITATION LIST

Patent Literature

[Patent Document 1] JP 2008-514782
[Patent Document 2] WO 2013/064756

DISCLOSURE OF INVENTION

Technical Problem

According to the present invention, rubber with a particle size of 100 to 300 nm can be uniformly dispersed in a thermoplastic resin containing an alloy, by optimizing length of a graft chain and a composition of the graft chain in a rubber-containing graft polymer, and strength developability that is required as a rubber-containing graft polymer can be improved.

Solution to Problem

The present inventors studied to solve the problems, and as a result, completed the present invention.

The present invention has the following aspects.

[1] A rubber-containing graft polymer, in which a rubber to be grafted has a particle size of 100 to 300 nm, a content of an organic solvent insoluble component in the rubber-containing graft polymer (100% by mass) is 92% to 99.5% by mass, and an organic solvent soluble component of the rubber-containing graft polymer has a weight average molecular weight of 250,000 to 700,000.

[2] The rubber-containing graft polymer according to [1], in which a content of a methyl methacrylate-derived product in the organic solvent soluble component (100% by mass) of the rubber-containing graft polymer is 84% by mass or more.

[3] A rubber-containing graft polymer, in which, in an organic solvent extract (100% by mass) extracted with an organic solvent from a freeze-ground organic solvent insoluble component obtainable by freeze-grinding an organic solvent insoluble component of the rubber-containing graft polymer, a content of a methyl methacrylate-derived product is 43% or higher, and a content of a component having a styrene-equivalent molecular weight of 300,000 or more determined by integral molecular weight distribution is 10% or higher.

[4] A rubber-containing graft polymer, which is obtainable by polymerizing, using a persulfate, a vinyl monomer for grafting containing 95% by mass or more of methyl methacrylate to rubber latex with a volume average particle size of 100 to 300 nm, which is obtainable by polymerizing, using a persulfate, a vinyl monomer containing 100 parts by mass of acrylate (a1) and 0.1 to 0.7 parts by mass of allyl methacrylate (a2).

[5] The rubber-containing graft polymer according to [4], which is obtainable without subjecting to a redox polymerization step using an iron compound.

[6] The rubber-containing graft polymer according to [4] or [5], which is obtainable by polymerizing 0.5 to 3.0 parts by mass of an aromatic vinyl monomer with respect to 100 parts by mass of the acrylate (a1) in the rubber latex, when polymerizing the vinyl monomer containing 100 parts by mass of the acrylate (a1) and 0.1 to 0.7 parts by mass of the allyl methacrylate (a2), or before polymerizing the vinyl monomer for grafting containing 95% by mass or more of the methyl methacrylate.

[7] A resin composition containing a rubber-containing graft polymer, including: the rubber-containing graft polymer according to any one of [1] to [6]; and a thermoplastic resin (B).

[8] The resin composition containing a rubber-containing graft polymer according to [7], in which the thermoplastic resin (B) contains an aromatic polycarbonate (b1).

[9] The resin composition containing a rubber-containing graft polymer according to [7] or [8], in which the thermoplastic resin (B) contains a styrene-based resin (b2).

[10] The resin composition containing a rubber-containing graft polymer according to any one of [7] to [9], in which the thermoplastic resin (B) contains polyester (b3).

[11] A shaped article obtained by shaping the resin composition containing a rubber-containing graft polymer according to any one of [7] to [10].

[12] The shaped article according to [11], which is an injection molded article.

Effects of Invention

A rubber-containing graft polymer of the present invention can be uniformly dispersed in a thermoplastic resin containing an alloy (for example, a PC/SAN-based thermoplastic resin), in a particle size of 100 nm to 300 nm. As a result, strength developability required as a rubber-containing graft polymer can be improved.

A resin composition containing a rubber-containing graft polymer of the present invention includes the rubber-containing graft polymer of the present invention. Therefore, the rubber-containing graft polymer can be uniformly dispersed and a shaped article obtained by shaping the resin composition containing the rubber-containing graft polymer of the present invention is excellent in impact strength and excellent in dependence of mechanical strength on shaping processing.

MODE FOR CARRYING OUT THE INVENTION

Figure 1:
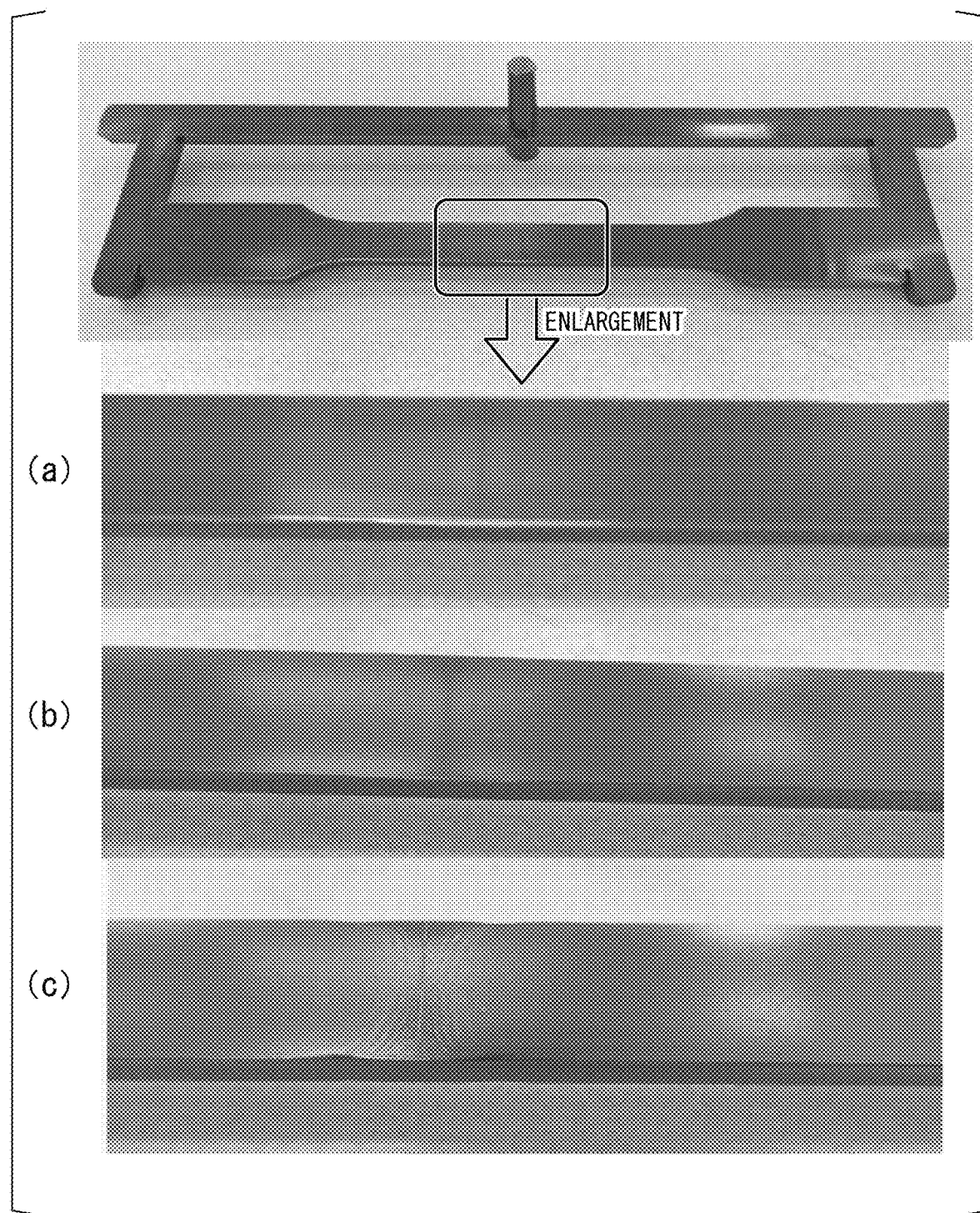
FIG. 1 is a photograph showing an appearance for illustrating condition when obtaining a test piece for measuring weld strength from pellets of a resin composition of each example or each comparative example.

Hereinafter, embodiments of the present invention will be described in detail.

[Rubber-Containing Graft Polymer]

A rubber-containing graft polymer of the present invention (hereinafter, also referred to as a "rubber-containing graft polymer (A)") is a material (graft latex) obtained by graft polymerization of a vinyl monomer to a rubbery polymer (rubber latex). For example, the vinyl monomer is graft-polymerized to a rubbery polymer obtainable in an aqueous medium under the presence of an emulsifier.

Hereinafter, a component which forms the rubber-containing graft polymer (A) and is derived from graft polymerization (component formed by graft polymerization of a vinyl monomer) is also referred to as a "graft component".

As a rubbery polymer that can be used in the present invention, those having a glass transition temperature of 0° C. or lower can be used.

When the glass transition temperature of the rubbery polymer is 0° C. or lower, impact strength represented by a value of a Charpy impact test of a shaped article obtained from the resin composition of the present invention is improved.

Specific examples of the rubbery polymer include the followings.

Silicone rubber, silicone-acrylic composite rubber (obtained by polymerizing one or more vinyl monomers containing an acrylate to a rubbery polymer obtained from a monomer mainly including dimethyl siloxane), an acrylic rubber such as polybutyl acrylate, polyisoprene, polychloroprene, ethylene/propylene rubber, and a block copolymer such as a styrene/isoprene block copolymer rubber, and hydrogenated products thereof.

In a cold region, it is necessary to improve impact strength of a shaped article at a lower temperature (−20° C. or lower). Therefore, silicone/acrylic composite rubber having a glass transition temperature of −20° C. or lower is preferable.

The rubbery polymer that can be used in the present invention has a volume average particle size of 100 to 300 nm. The rubbery polymer more preferably has a volume average particle size of 150 to 250 nm.

When the volume average particle size of the rubbery polymer is within the above range, a shaped article tends to be excellent in impact strength.

The volume average particle size of the rubbery polymer can be measured by a nanoparticle size distribution measuring apparatus using a light scattering method or a capillary particle size distribution meter using capillary hydrodynamic fractionation (CHDF method), and is preferably measured by the light scattering method.

The volume average particle size of the rubbery polymer can be adjusted by adjusting the amount of an emulsifier in production of the rubbery polymer by emulsion polymerization.

The vinyl monomer which can be graft-polymerized to the rubber-containing graft polymer of the present invention is preferably methyl methacrylate or a vinyl monomer mixture containing methyl methacrylate as a main component.

The vinyl monomer mixture may contain other vinyl monomers within 5% by mass relative to total mass of the vinyl monomer to be graft-polymerized to the rubbery polymer. Examples of other vinyl monomers include an aromatic vinyl compound such as styrene and α-methylstyrene; acrylic ester such as methyl acrylate and butyl acrylate; and methacrylic ester such as ethyl methacrylate, and these may be copolymerized with methyl methacrylate.

It is preferable that the vinyl monomer is selected so that a glass transition temperature of the polymer or copolymer obtained by polymerizing the vinyl monomer (homopolymerization or copolymerization of two or more kinds in combination) is 70° C. or higher, from a viewpoint of characteristics of a powder (fluidity or a particle size of a powder) obtained from a subsequent coagulation step.

The glass transition temperature of the polymer formed of the vinyl monomer to be graft-polymerized to the rubbery polymer is more preferably 80° C. or higher, and still more preferably 90° C. to 105° C. For example, a copolymer of methyl methacrylate and butyl acrylate tends to have a glass transition temperature in a range of 90° C. to 105° C., and is preferably used.

A content of the rubbery polymer in the rubber-containing graft polymer (A) is preferably 50% to 95% by mass, more preferably 70% to 94% by mass, still more preferably 75% to 93% by mass, particularly preferably 77% to 92% by mass, and most preferably 80% to 91% by mass, from a viewpoint of the impact strength of a shaped article.

The rubber-containing graft polymer (A) can be usually obtained by converting the rubbery polymer into a latex state in the presence of an emulsifier and water, and adding the vinyl monomer thereto to perform graft polymerization.

The volume average particle size of the powder containing the rubber-containing graft polymer (A) of the present invention is preferably 300 to 500 µm.

When the particle size of the powder is equal to or larger than the above lower limit, scattering can be suppressed at the time of blending or charging into a mixing device when preparing a resin composition, and a problem such as dust explosion is unlikely to occur. In addition, when the particle size of the powder is equal to or smaller than the upper limit, the flow characteristic of the powder is favorable, and a problem such as clogging in a pipe in a production step is unlikely to occur.

The rubbery polymer includes a component "rubber cross-linking component" which has cross-linking and insoluble in an organic solvent and a component "rubber non-cross-linking component" which is polymerized without cross-linking. It is preferable that a content of the "rubber cross-linking component" in the rubbery polymer is high.

The graft chain in the rubber-containing graft polymer of the present invention is a polymer having a structural unit derived from a vinyl monomer, which is chemically bonded to a rubber cross-linking component in the rubbery polymer.

The vinyl monomer for grafting used for graft polymerization can be classified to a "vinyl monomer mgp", which chemically bonds to the rubbery polymer in practical, a "vinyl monomer mfp", which is polymerized without chemically bonding to the rubbery polymer to form a free polymer, and a "vinyl monomer mfm", which does not undergo polymerization reaction. In the vinyl monomer mgp chemically bonding to the rubbery polymer, a vinyl monomer component chemically bonding to the component "rubber cross-linking component" which has cross-linking and insoluble in an organic solvent is defined as a "graft chain" in the rubber-containing graft polymer of the present invention (graft chain in "Rg" to be described later). In the vinyl monomer mgp, it is preferable that a content of the vinyl monomer chemically bonding to the component "rubber cross-linking component" which is cross-linked and insoluble in an organic solvent is high.

In the vinyl monomer mgp chemically bonding to the rubbery polymer in the rubber-containing graft polymer (A), when the amount of the vinyl monomer chemically bonding to the "rubber cross-linking component" is large, it is easily dispersed in a thermoplastic resin (B) to be described later, and also, interface strength between the thermoplastic resin (B) and the rubber improves. The better dispersibility of the rubber-containing graft polymer (A) and the higher the interface strength, the further the impact strength of the shaped article improves, and preferable.

Almost all the vinyl monomer mfm that does not undergo the polymerization reaction is removed in a subsequent recovery step (a coagulation or spray recovery step and a drying step of an obtained powder, which will be described later).

The rubber-containing graft polymer (A) of the present invention is formed of the following five components.

Rg: Rubber cross-linking component and graft chain derived from vinyl monomer chemically bonding thereto R0: Non-grafted rubber cross-linking component Ng: Non-cross-linking rubber component and graft chain derived from vinyl monomer chemically bonding thereto N0: Non-grafted rubber non-cross-linking component "Free polymer Pf": Polymer or copolymer derived from vinyl monomer non-grafted to rubbery polymer Organic solvent insoluble components of the rubber-containing graft polymer (A) are components (Rg+R0) derived from the rubber cross-linking component.

An organic solvent that can be used for extraction of the organic solvent insoluble component and the soluble component of the rubber-containing graft polymer (A) does not chemically change the rubber-containing graft polymer (A) and is not particularly limited, as long as it has sufficient solubility in each polymer forming the rubber-containing graft polymer (A), in a case of non-cross-linking Examples thereof include, preferably, acetone and tetrahydrofuran can be mentioned.

From a viewpoint of workability, acetone is preferable in view of high volatility and easiness to evaporate the solvent. However, since acetone has low solubility in the polymer mainly containing styrene, in a case where the rubber-containing graft polymer (A) contains a structural unit derived from styrene, tetrahydrofuran is preferable.

(Method of Measuring Organic Solvent Soluble Component and Organic Solvent Insoluble Component)

Regarding the organic solvent insoluble component of the rubber-containing graft polymer (A), a precisely weighed rubber-containing graft polymer sample and an organic solvent are sufficiently mixed and allowed to stand, and then an operation of separating the organic solvent soluble component and the organic solvent insoluble component from each other by centrifugation is performed multiple times. The organic solvent insoluble component can be quantified by removing the organic solvent from a combined organic solvent insoluble component.

Specific examples of a method of measuring the organic solvent soluble component and the organic solvent insoluble component of the rubber-containing graft polymer (A) include an example using acetone as an organic solvent will be described. In a case where an organic solvent other than the acetone is used as the organic solvent, the measurement can be performed according to the following example, using the solvent in place of acetone.

1 g of the rubber-containing graft polymer sample (this mass is referred to as [W0] (g)) is precisely weighed in a 50 mL sample vial and 30 mL of acetone is added thereto, and a lid is closed. Stirring is performed by hand, and then, the mixture is allowed to stand for 8 hours. Using a centrifuge (Hitachi high-speed cooling centrifuge (CR22N), manufactured by Hitachi Koki Co., Ltd.), centrifugation is performed at a temperature of 4° C. for 60 minutes at a rotation speed of 12,000 rpm to separate the mixture into a soluble component and an insoluble component. 30 mL of acetone is again added and dispersed to the obtained insoluble component, and centrifugation is performed by a centrifuge to separate the mixture into a soluble component and an insoluble component. After repeating the operation three times, the insoluble component is centrifuged, and then set in an inert oven (DN610I, manufactured by Yamato Scientific Co., Ltd.) under a nitrogen atmosphere, and heated at 40° C. overnight or longer to remove acetone. Then, it is vacuum-dried at 40° C., and the insoluble component is weighed (this mass is referred to as [W1] (g)). From the result, a rate of the acetone insoluble component is determined by the following formula.

Acetone insoluble component (% by mass)=([$W$1]/ [$W$0])×100

When the content of the organic solvent insoluble component in 100% by mass of the rubber-containing graft polymer is 92% to 99.5% by mass, it can be determined that the amount of the "rubber non-cross-linking component" is sufficiently small, and the graft chain can be considered to have the same value as of the "free polymer Pf" (non-grafted to the rubbery polymer). In this case, the rubber-containing graft polymer can be considered to be formed of the Rg and the "free polymer Pf".

In the rubber-containing graft polymer, in a case where it can be considered to be formed of the Rg and the "free polymer Pf", the "free polymer Pf" can be considered as the organic solvent soluble component. In this case, a weight average molecular weight of the organic solvent soluble component of the "free polymer Pf" is 250,000 to 700,000. In addition, a content of a methyl methacrylate-derived product in 100% by mass of the organic solvent soluble component is preferably 84% by mass or more.

The "graft chain" of the present invention is a vinyl polymer chemically bonding to the rubber cross-linking component that is insoluble in the organic solvent of the rubbery polymer.

A chain length of the "graft chain" is 250,000 to 700,000 in terms of weight average molecular weight. In this case, the efficiency of dispersibility of the "rubbery polymer" in the thermoplastic resin can be promoted. The better the dispersibility of the rubbery polymer in the thermoplastic resin, the further the mechanical strength represented by impact strength improves. In addition, the better the dispersibility of the rubber, the better the mechanical strength is exhibited irrespective of a condition under which the thermoplastic resin is melt shaped by injection molding or the like (dependence of mechanical strength on shaping processing is low).

In addition, a composition of the "graft chain" preferably contains 84% by mass or more of the methyl methacrylate-derived product. In this case, efficiency of dispersibility of the "rubbery polymer" in the thermoplastic resin can further be promoted.

The rubber-containing graft polymer of the present invention has a graft chain with length of 250,000 to 700,000, more preferably 350,000 to 600,000, and still more preferably 450,000 to 550,000 in terms of weight average molecular weight. When the length of the graft chain is within the above range, the dependence of mechanical strength represented by impact strength on shaping processing can be reduced.

In the rubber-containing graft polymer of the present invention, the content of the methyl methacrylate-derived product in the composition of the graft chain is preferably 84% by mass or more, more preferably 90% by mass or more, and still more preferably 95% by mass or more, and it is particularly preferable to contain only the methyl methacrylate (100% by mass).

When the content of the methyl methacrylate-derived product in the composition of the graft chain is equal to or more than the above lower limit, the dependence of mechanical strength represented by impact strength on shaping processing can be reduced.

When the content of the organic solvent insoluble component of the rubber-containing graft polymer of the present invention is high, the graft chain of the rubber-containing graft polymer (A) can be considered to be the same as the organic solvent soluble component. When the organic solvent insoluble component is set to 92% to 99.5% by mass, the accuracy, that the graft chain becomes the same as the organic solvent soluble component, increases. The rate of the organic solvent insoluble component of the rubber-containing graft polymer is preferably from 94% to 99.5% by mass, still more preferably 96% to 99.5% by mass, and particularly preferably 98% to 99% by mass.

According to an aspect of the rubber-containing graft polymer of the present invention, in 100% by mass of an organic solvent extract extracted with an organic solvent from a freeze-ground organic solvent insoluble component obtained by freeze-grinding an organic solvent insoluble component of the rubber-containing graft polymer, a content of the methyl methacrylate-derived product is 43% or higher, and a content of a component having a styrene-equivalent molecular weight of 300,000 or more determined by integral molecular weight distribution is 10% or higher.

In an organic solvent extract extracted with an organic solvent from the organic solvent insoluble component of the rubber-containing graft polymer after freeze-grinding, the content of methyl methacrylate is 43% by mass or more, preferably 45% by mass or more, and more preferably 48% by mass or more.

By the freeze-grinding, the rubber-containing graft polymer can be decomposed, and the cross-linked graft chain and a part of the cross-linked rubber can be extracted with an organic solvent. When a large amount of the methyl methacrylate-derived product is contained in the graft chain, the dependency of mechanical strength represented by impact strength on shaping processing can be reduced. Therefore, also in an organic solvent extract obtained by freeze-grinding the organic solvent insoluble component of the rubber-containing graft polymer and then extracted with an organic solvent, it is preferable that the content of the methyl methacrylate is higher.

In an organic solvent extract obtained by freeze-grinding the organic solvent insoluble component of the rubber-containing graft polymer and then further extracted with an organic solvent, the content of the component having a styrene-equivalent molecular weight of 300,000 or more determined by integral molecular weight distribution is 10% or higher, preferably 12% by mass or more, and more preferably 15% by mass or more.

By the freeze-grinding, the rubber-containing graft polymer can be decomposed, and the cross-linked graft chain and a part of the cross-linked rubber can be extracted with an organic solvent. As the molecular weight of the graft chain is large, the dependency of mechanical strength represented by impact strength on shaping processing can be reduced. Therefore, also in an organic solvent extract obtained by freeze-grinding the organic solvent insoluble component of the rubber-containing graft polymer and then extracted with an organic solvent, it is preferable to contain a high molecular weight component having a styrene-equivalent molecular weight of 300,000 or more determined by integral molecular weight distribution, in a large amount.

In addition, in the freeze-grinding, grinding is necessary to be performed at a ratio equal to or less than the MMA content in the organic solvent insoluble component of the rubber-containing graft polymer. In a case where the freeze-grinding is performed at a ratio exceeding the MMA content in the organic solvent insoluble component, the amount of the rubber component that is freeze-ground increases, and the cross-linked graft chain and a part of the cross-linked rubber cannot be extracted with an organic solvent, which is not preferable.

Regarding the organic solvent extract, an organic solvent insoluble component of a precisely weighed rubber-containing graft polymer is freeze-ground and then the freeze-ground organic solvent insoluble component is mixed with an organic solvent and allowed to stand, and an operation of separating the soluble component and insoluble component from each other by centrifugation is performed multiple times. The organic solvent extract can be quantified by removing the organic solvent from a combined soluble component.

Specific examples of an extraction method of an organic solvent extract will be described using an example in which acetone is used as the organic solvent. In a case where an organic solvent other than acetone is used as the organic solvent, the measurement can be performed according to the following example, using the solvent in place of acetone.

Using a 6751 vial (polycarbonate tube, steel end plug and styrol impactor) as a grinding container, 0.9 g of an organic solvent insoluble component of the rubber-containing graft polymer is freeze-ground (manufactured by SPEX CertiPrep Ltd, product name: SPEX6750 FREEZER/MILL: Condition Pre-cooling 15 minutes, grinding time 2 minutes (20 times/sec), cooling time 2 minutes, 4 cycles). 100 mg of freeze-ground organic solvent insoluble component is precisely weighed, transferred to a 50 mL vial, and further stirred with additional 30 mL of acetone thereto, and then allowed to stand for 10 hours. The soluble component and the insoluble component are separated from each other by performing centrifugation using a centrifuge (Hitachi high-speed cooling centrifuge (CR22N), manufactured by Hitachi Koki Co., Ltd.) at a temperature of 4° C. for 60 minutes at a rotation speed of 12,000 rpm. 30 mL of acetone is again added and dispersed to the obtained insoluble component, and centrifugation is performed by a centrifuge to separate the mixture into a soluble component and an insoluble component. The soluble component and the insoluble component are dried respectively, in an inert oven at 40° C. for 10 hours or longer under nitrogen.

Among these, a dried product of the soluble component was used as an organic solvent soluble component (organic solvent extract) obtained by freeze-grinding the organic solvent insoluble component of the rubber-containing graft polymer.

(Measurement of Composition Ratio of Organic Solvent Extract)

For measurement of a composition ratio of the organic solvent soluble component (organic solvent extract) after freeze-grinding, a nuclear magnetic resonance method ($^1$H-NMR) was used for the measurement.

Measuring apparatus: Nuclear magnetic resonance spectrometer (product name: UNITYINOVA500, manufactured by Varian)

Sample amount: 10 to 20 mg of acetone soluble component after freeze-grinding

Organic solvent: Deuterated chloroform 650 μL (chemical shift 7.26 ppm: NMR analysis was performed at a peak of chloroform in deuterated chloroform of 7.26 ppm)

Measurement temperature: 21° C.
Cumulative number: 256 times
Nuclide: $^1$H

A peak of 3.2 ppm to 3.8 ppm of the obtained $^1$H-NMR spectrum was set as a peak derived from a methyl group of polymethyl methacrylate, and the peak of 3.8 to 4.4 ppm was calculated as a peak derived from a methylene group of polybutyl acrylate, and a MMA/BA ratio was calculated.

(Measurement of Weight Average Molecular Weight (Mw) of Organic Solvent Extract)

For measurement of a composition ratio of the organic solvent soluble component after freeze-grinding, gel permeation chromatography (GPC) is used for the measurement.

Measuring apparatus: HLC-8320 (manufactured by Tosoh Corporation)

Sample concentration: 2 mg/mL of each component in tetrahydrofuran solution

Guard column: TSK-guardcolumn SUPER H-H-H (manufactured by Tosoh Corporation)

Separation column: Two connected TSK-GEL SUPER HM-H (6.0 mmφ×150 mm, manufactured by Tosoh Corporation)

Detector: Differential refractometer (RI)
Separation column temperature: 40° C.
Moving bed: Tetrahydrofuran (flow rate 0.6 ml/min)
Sample injection volume: 10 μL Calibration curve creation method: Calibration curve (third-order formula) was created using 11 types of polystyrene with a known molecular weight (Mw of 1013 to 6,770,000) and 2,2'-methylene bis(6-tert-butyl-p-cresol) (molecular weight 340) to determine the weight average molecular weight.

An integral molecular weight distribution diagram was created and the content of a component having a molecular weight of 300,000 or more was calculated.

(Polymerization Initiator)

Examples of a polymerization initiator that can be used when graft polymerization of the rubber-containing graft polymer of the present invention is performed include a peroxide and an azo-based initiator. In a case where the length of the graft chain is increased, the persulfate is preferable. In the graft polymerization, redox polymerization using an iron compound is frequently used. However, in this case, the weight average molecular weight conversion value of the graft chain tends to be 100,000 or less, which is not preferable.

Examples of the persulfate include an ammonium persulfate (APS), a sodium persulfate (NPS), and a potassium persulfate (KPS).

In a case where the rubbery polymer used for the rubber-containing graft polymer of the present invention is an acrylic rubber, allyl methacrylate or triallyl isocyanurate is mainly used as a graft cross-linking agent. Allyl methacrylate (a2) is easier to produce the rubber-containing graft polymer of the present invention.

As an example, a "rubber polymer" (rubber latex) is produced by polymerizing a vinyl monomer containing 100 parts by mass of acrylate (a1) and 0.1 to 0.7 parts by mass of allyl methacrylate (a2) using a persulfate and a vinyl monomer for grafting containing 95% by mass or more of methyl methacrylate is polymerized to the rubber latex using a persulfate. Accordingly, the rubber-containing graft polymer (A) can be obtained. In the rubber-containing graft polymer produced by this method, the weight average molecular weight of the organic solvent soluble component can be made 250,000 to 750,000. In addition, the content of the methyl methacrylate-derived product contained in the organic solvent soluble component can be made 84% by mass or more. When the volume average particle size of the rubber latex is in the range of 100 to 300 nm, the strength developability of the rubbery polymer in the thermoplastic resin is excellent.

Examples of the acrylate (a1) that can be used in the production method include an alkyl acrylate monomer such as methyl acrylate, ethyl acrylate, n-propyl acrylate, n-butyl acrylate, 2-ethylhexyl acrylate, and n-octyl acrylate, and an alkyl methacrylate monomer such as hexyl methacrylate, 2-ethylhexyl methacrylate, lauryl methacrylate, tridecyl methacrylate, and stearyl methacrylate.

In the production method, when producing the rubber latex by polymerizing the vinyl monomer containing 100 parts by mass of the acrylate (a1) and 0.1 to 0.7 parts by mass of the allyl methacrylate (a2) by using the persulfate, or before polymerizing the vinyl monomer for grafting containing 95% by mass or more of the methyl methacrylate, it is preferable to polymerize 0.5 to 3.0 parts by mass, preferably 1.2 to 2.8 parts by mass of the aromatic vinyl monomer with respect to 100 parts by mass of the acrylate (a1) in rubber latex, from the viewpoint of increasing the organic solvent insoluble component.

The rubber-containing graft polymer (A) obtained by the production method is excellent in dispersibility of the "rubbery polymer" in the thermoplastic resin, and improves the mechanical strength represented by impact strength. In addition, favorable mechanical strength is exhibited irrespective of a condition under which the thermoplastic resin is melt shaped by injection molding or the like (dependence of mechanical strength on shaping processing is low).

Examples of the emulsifier used for the graft polymerization of the rubber-containing graft polymer of the present invention include alkali metal salt of acid such as fatty acid, sulfonic acid, sulfuric acid, and phosphoric acid.

The rubber-containing graft polymer (A) of the present invention in a latex state obtained by the graft polymerization can be obtained as a powder by coagulating and washing and then drying, or by spray recovery.

[Thermoplastic Resin (B)]

A resin composition containing a rubber-containing graft polymer of the present invention is a composition containing a thermoplastic resin represented by an aromatic polycarbonate, a styrene-based resin, and polyester, and the rubber-containing graft polymer (A).

In many thermoplastic resins, including vinyl chloride resin and olefin resin such as polyethylene, a resin modifier containing methyl methacrylate as a main component is often used. Therefore, the rubber-containing graft polymer (A) of the present invention including a graft chain having methyl methacrylate as a main component can be suitably used.

Therefore, the thermoplastic resin (B) is not particularly limited. For example, a wide variety of resins such as engineering plastic, styrene-based resin, polyester, olefin resin, thermoplastic elastomer, a biodegradable polymer, a halogen polymer, and acrylic resin can be used.

The engineering plastic is not particularly limited as long as it is various known thermoplastic engineering plastics. Examples thereof can include polyphenylene ether, polycarbonate, polyester-based polymers such as polyethylene terephthalate, and polybutylene terephthalate, syndiotactic polystyrene, nylon polymers such as 6-nylon, and 6,6-nylon, polyarylate, polyphenylene sulfide, polyetherketone, polyetheretherketone, polysulfone, polyether sulfone, polyamide imide, polyetherimide, and polyacetal.

In addition, examples of the engineering plastics in the present invention can include special styrene-based resin, such as heat-resistant ABS, or heat-resistant acrylic resin, which is highly heat-resistant and requires melt fluidity. Among these, the aromatic polycarbonate or polybutylene terephthalate, required to have higher strength developability, is more preferable. Examples of the aromatic polycarbonate include 4,4'-dioxydiarylalkane-based polycarbonate such as 4,4'-dihydroxydiphenyl-2,2-propane (that is, bisphenol A)-based polycarbonate.

Examples of the olefin resin include copolymers of high-density polyethylene, medium-density polyethylene, low-density polyethylene, or ethylene and other α-olefins; copolymers of polyethylene, propylene and other α-olefins; and polybutenes, and poly-4-methylpentene-1.

Examples of the thermoplastic elastomer include styrene-based elastomers such as a styrene-butadiene-styrene copolymer (SBS), a styrene-isoprene-styrene copolymer (SIS), a styrene-ethylene/butene copolymer (SEB), a styrene-ethylene/propylene copolymer (SEP), a styrene-ethylene/butene-styrene copolymer (SEBS), a styrene-ethylene/propylene-styrene copolymer (SEPS), a styrene-ethylene/ethylene-propylene-styrene copolymer (SEEPS), a styrene-butadiene/butylene-styrene copolymer (partially hydrogenated styrene-butadiene-styrene copolymer: SBBS), a partially hydrogenated styrene-isoprene-styrene copolymer, and a partially hydrogenated styrene-isoprene/butadiene-styrene copolymer, urethane-based elastomers produced by reacting a polymer diol (such as polyester diol, polyether diol, polyester ether diol, polycarbonate diol, and polyester polycarbonate diol), an organic diisocyanate (examples of the organic diisocyanates include 4,4'-diphenylmethane diisocyanate, toluene diisocyanate, p-phenylene diisocyanate, xylylene diisocyanate, naphthalene diisocyanate, hydrogenated 4,4'-diphenylmethane diisocyanate (4,4'-dicyclohexyl methane diisocyanate), isophorone diisocyanate, and hexamethylene diisocyanate, and among these organic diisocyanates, 4,4'-diphenylmethane diisocyanate) and a chain extender (such as ethylene glycol, diethylene glycol, 1,4-butanediol, 1,5-pentanediol, 2-methyl-1,3-propanediol, 1,6-hexanediol, neopentyl glycol, 1,9-nonanediol, cyclohexanediol, and 1,4-bis(β-hydroxyethoxy)benzene), polyolefin-based elastomers such as ethylene-propylene rubber, ethylene-propylene-diene rubber, an ethylene-vinyl acetate copolymer, butyl rubber, butadiene rubber, a propylene-butene copolymer, and an ethylene-acrylate copolymer, polyamide-based elastomer, fluorine-based elastomer, chlorinated PE elastomer, and acrylic elastomer.

Examples of the styrene-based resin include polystyrene, an acrylonitrile-styrene copolymer, an acrylonitrile-styrene-α-methylstyrene copolymer, an acrylonitrile-methyl methacrylate-styrene-α-methylstyrene copolymer, ABS resin, AS resin, MABS resin, MBS resin, AAS resin, AES resin, an acrylonitrile-butadiene-styrene-α-methylstyrene copolymer, an acrylonitrile-methyl methacrylate-butadiene-styrene-α-methylstyrene copolymer, a styrene-maleic anhydride copolymer, a styrene-maleimide copolymer, a styrene-N-substituted maleimide copolymer, an acrylonitrile-styrene-N-substituted maleimide copolymer, an acrylonitrile-butadiene-styrene-β-isopropenylnaphthalene copolymer, and an acrylonitrile-methyl methacrylate-butadiene-styrene-α-methylstyrene-maleimide copolymer. One kind of these may be contained alone and two or more kinds thereof may be contained.

The polyester is a polymer formed of a polybasic acid and a polyhydric alcohol, and is not particularly limited as long as it has thermoplasticity. Examples of the polybasic acid include terephthalic acid, naphthalenedicarboxylic acid, cyclohexyldicarboxylic acid, or esters thereof. Examples of the polyhydric alcohols include ethylene glycol, propylene glycol, butanediol, pentanediol, neopentyl glycol, hexanediol, octanediol, decanediol, cyclohexanedimethanol, hydroquinone, bisphenol A, 2,2-bis(4-hydroxyethoxyphenyl) propane, 1,4-dimethyloltetrabromobenzene, and TBA-EO. The polyester resin may be a homopolymer, a copolymer, or a blend of two or more thereof. In addition, "PETG" (trade name, manufactured by Eastman Chemical Company) is also suitably used.

Examples of the biodegradable polymer include a microbial polymer such as biopolyester (such as PHB/V), bacterial cellulose, and microbial polysaccharide (such as pullulan and curdlan), a chemically synthesized polymer such as aliphatic polyester (such as polycaprolactone, polybutylene succinate, polyethylene succinate, polyglycolic acid, and polylactic acid), polyvinyl alcohol, and polyamino acids (such as PMLG), or a natural product polymer such as chitosan/cellulose, starch, cellulose acetate.

Examples of the halogenated polymer include a homopolymer of vinyl chloride, a copolymer containing vinyl chloride in a proportion of 80% by mass or more, and a highly chlorinated polyvinyl chloride. Examples of components of the copolymer include a monovinylidene compound such as ethylene, vinyl acetate, methyl methacrylate, and butyl acrylate, in addition to the vinyl chloride. In the copolymer, these compounds may be contained in a proportion of a total amount of 20% by mass or less. The homopolymer and the copolymer may be contained respectively alone, and two or more kinds thereof may be contained. In addition, examples thereof also include a fluorinated polymer, a brominated polymer, and an iodinated polymer.

Examples of the acrylic resin include a copolymer obtainable by polymerizing a vinyl monomer copolymerizable with methyl methacrylate. Examples of the vinyl monomer include alkyl acrylate such as methyl acrylate, ethyl acrylate, i-propyl acrylate, n-butyl acrylate, and 2-ethylhexyl acrylate, alkyl methacrylate such as ethyl methacrylate, propyl methacrylate, and n-butyl methacrylate, and an aromatic vinyl compound such as styrene, α-methylstyrene, and vinyltoluene.

The scope of the present invention includes polyphenylene ether, polycarbonate, a polyester-based resin such as polyethylene terephthalate, and polybutylene terephthalate, syndiotactic polystyrene, nylon polymers such as 6-nylon, and 6,6-nylon, an engineering plastics such as polyarylate, polyphenylene sulfide, polyetherketone, polyetheretherketone, polysulfone, polyether sulfone, polyamide imide, polyetherimide, and polyacetal, and polymer alloys of above described thermoplastic resins.

The resin composition of the present invention can include, in addition to the above materials, various known additives, for example, a stabilizer, a flame retardant, a flame retardant aid, a hydrolysis inhibitor, an antistatic agent, a foaming agent, a dye, and a pigment, within a range not impairing the object of the present invention.

A method of blending each material when preparing the resin composition of the present invention includes a known blending method, and is not particularly limited. Examples thereof include a method of mixing and kneading with a tumbler, a V-type blender, a super mixer, a Nauta mixer, a Banbury mixer, a kneading roll, an extruder, or the like.

EXAMPLES

Hereinafter, the present invention will be further specifically described, using Production Examples and Examples. Production Examples 1 to 9 are production examples of the rubbery polymer and the rubber-containing graft polymer (A). "Part(s)" means "part(s) by mass", and "%" means "% by mass".

Production Example 1

"Component 1" formed of water and an emulsifier shown in Table 1 was added into a separable flask equipped with a cooling pipe, a thermometer, and a stirrer. The atmosphere in the flask was purged with nitrogen by passing a nitrogen stream through the separable flask and a liquid temperature was raised to 80° C. At the time when the liquid temperature reached 80° C., a seed monomer "Component 2" shown in Table 1 was mixed, and after stirring for 5 minutes, a polymerization initiator "Component 3" shown in Table 1 was added thereto, and the polymerization was started (the temperature may increase by about 10° C. as a maximum value due to heat generated by polymerization). Thereafter, the liquid temperature was maintained for 25 minutes while keeping the temperature not lower than 78° C.

Further, a rubber-forming monomer "Component 4" shown in Table 1 was forcibly emulsified and added dropwise into the separable flask over 180 minutes while controlling the liquid temperature at 80±2° C. Thereafter, the mixture was kept for 60 minutes while maintaining the liquid temperature at 80° C.±2° C. In this manner, rubbery polymer latex was obtained. A particle size of the rubbery polymer latex at this time was 200 nm as measured by a light scattering method. A rate of polymerization was 99%. Subsequently, a graft component monomer "Component 6" shown in Table 1 was added dropwise over 30 minutes while controlling a liquid temperature thereof at 80±2° C. Thereafter, the mixture was kept for 60 minutes while maintaining the liquid temperature at 80° C.±2° C. In this manner, acrylic rubber-based graft latex was obtained. A rate of polymerization was 99.5%. In addition, for sodium dodecylbenzenesulfonate, "NEOPELEX G-15 (trade name, 16% aqueous solution of sodium dodecylbenzenesulfonate), manufactured by KAO Corporation" was used. For sodium dialkyl sulfosuccinate, "PELEX OT-P (trade name, 80% methanol solution of sodium dialkyl sulfosuccinate), manufactured by KAO Corporation" was used.

TABLE 1

| Rubber-containing graft polymer | | Production Example 1 A-1 | Production Example 2 A-2 | Production Example 3 A-3 | Production Example 4 A-4 | Production Example 5 A-5 | Production Example 6 A-6 | Production Example 7 A-7 |
|---|---|---|---|---|---|---|---|---|
| Component 1 | Deionized water | 160.00 | 160.00 | 160.00 | 160.00 | 160.00 | 80.00 | 160.00 |
|  | Sodium dialkyl sulfosuccinate | 0.08 | 0.08 | 0.08 | 0.08 | 0.08 | 0.02 | 0.08 |
| Component 2 | Methyl methacrylate | 3.15 | 3.15 | 3.15 | 3.15 | 3.15 | 1.60 | 3.15 |
|  | n-Butyl acrylate | 1.62 | 1.62 | 1.62 | 1.62 | 1.62 | 0.80 | 1.62 |
|  | Allyl methacrylate | 0.02 | 0.02 | 0.02 | 0.02 | 0.02 | 0.04 | 0.02 |

TABLE 1-continued

| Rubber-containing graft polymer | | Production Example 1 A-1 | Production Example 2 A-2 | Production Example 3 A-3 | Production Example 4 A-4 | Production Example 5 A-5 | Production Example 6 A-6 | Production Example 7 A-7 |
|---|---|---|---|---|---|---|---|---|
| Component 3 | Potassium peroxydisulfate | 0.05 | 0.05 | 0.05 | 0.05 | 0.05 | 0.04 | 0.05 |
| | Deionized water | 3.00 | 3.00 | 3.00 | 3.00 | 3.00 | 1.60 | 3.00 |
| Component 4 | n-Butyl acrylate | 73.12 | 72.12 | 74.12 | 73.12 | 73.12 | 76.40 | 74.12 |
| | Styrene | 1.00 | 2.00 | — | 1.00 | 1.00 | — | — |
| | Allyl methacrylate | 0.38 | 0.38 | 0.38 | 0.38 | 0.38 | 1.20 | 0.38 |
| | Sodium dodecylbenzenesulfonate | 0.38 | 0.38 | 0.38 | 0.38 | 0.38 | 2.40 | 0.38 |
| | Deionized water | 24.00 | 24.00 | 24.00 | 24.00 | 24.00 | 24.00 | 24.00 |
| Component 4' | Styrene | — | — | 1.00 | — | — | — | — |
| Component 5 | Ferrous sulfate | — | — | — | — | — | — | 0.001 |
| | Ethylenediamine tetraacetic acid-disodium | — | — | — | — | — | — | 0.003 |
| | Sodium formaldehyde sulfoxylate | — | — | — | — | — | — | 0.30 |
| | Deionized water | — | — | — | — | — | — | 4.17 |
| Component 6 | Methyl methacrylate | 20.00 | 20.00 | 20.00 | 19.00 | 18.00 | 20.00 | 20.00 |
| | n-Butyl acrylate | — | — | — | 1.00 | 2.00 | — | — |
| | t-Butyl hydroperoxide | — | — | — | — | — | — | 0.04 |
| Parts by mass of allyl methacrylate in Components 2, 4, and 4' in terms of 100 parts by weight of n-butyl acrylate in Components 2 and 4 | | 0.54 | 0.54 | 0.53 | 0.54 | 0.54 | 1.61 | 0.53 |
| Parts by mass of styrene in Components 2, 4, and 4' in terms of 100 parts by weight of n-butyl acrylate in Components 2 and 4 | | 1.34 | 2.71 | 1.32 | 1.34 | 1.34 | 0.00 | 0.00 |
| % by mass of n-butyl acrylate in Component 6 | | 0.00 | 0.00 | 0.00 | 5.00 | 10.00 | 0.00 | 0.00 |
| Particle size of rubber polymer latex [nm] | | 200 | 200 | 200 | 200 | 200 | 370 | 200 |

An aqueous solution in which "Component 1" shown in Table 2 was blended was set to have a liquid temperature of 40° C.±5° C., and the acrylic rubber-based graft latex obtained above was charged into the aqueous solution to form slurry. The slurry was agglomerated by raising the liquid temperature to 70° C.±5 and keeping for 5 minutes. The agglomerate was collected, repeated twice immersing in 1500 parts of deionized water and dehydrating, and dried at 65° C.±5 for 12 hours to obtain a powder of a rubber-containing graft polymer (A-1).

TABLE 2

| | Material | Part(s) |
|---|---|---|
| Component 1 | Deionized water | 500 |
| | Potassium acetate | 5 |

Production Examples 2 to 7

Except that each component shown in Table 1 was changed, Powders of rubber-containing graft polymers (A-2) to (A-7) were obtained in the same manner as in Production Example 1. A rate of polymerization of each of the rubber latex and the graft latex was 99% or more.

However, Production Examples 3 and 7 include the following steps.

In Production Example 3, "Component 4" was forcibly emulsified and added dropwise over 180 minutes into the separable flask while controlling the liquid temperature at 80±2° C., then the mixture was kept for 30 minutes while maintaining the liquid temperature at 80° C., then styrene of "Component 4" was charged, and then the mixture was kept for 30 minutes while maintaining the liquid temperature at 80° C. to obtain rubbery polymer latex.

In Production Example 7, after obtaining the rubbery polymer latex, a redox-based material "Component 5" was blended therewith. Since the amount of ferrous sulfate or ethylenediamine-disodium was small, Component 5 was blended in the amount of 10 times, and ¹/₁₀ of the amount was weighed and charged to the rubber latex.

<Emulsion of Stabilizer>

"Component 1" shown in Table 3 was dissolved at a temperature of 80° C. Next, an aqueous solution of "Component 2" shown in Table 3 was charged into the above solution and forcedly emulsified to prepare an emulsion of a stabilizer.

TABLE 3

| | Material | Part(s) |
|---|---|---|
| Component 1 | bis[(3-(3-tert-butyl-4-hydroxy-5-methylphenyl)propionate] [Ethylene bis(oxyethylene)] (manufactured by BASF, trade name: Irganox 245) | 1.9 |
| | Didodecyl 3,3'-thiodipropionate (manufactured by BASF, trade name: Irganox PS-800) | 5.7 |
| | Oleic acid | 0.8 |
| Component 2 | Potassium hydroxide | 0.17 |
| | Deionized water | 8 |

Production Example 8

(1) Production of Diene Rubbery Polymer Latex (R-1)

"Component 1" shown in Table 4 as a first monomer mixed liquid was charged into an autoclave with 70 L capacity, and the temperature was raised. At the time when the liquid temperature reached 43° C., a redox-based initiator of "Component 2" shown in Table 4 was added to start a reaction, and then the liquid temperature was further raised to 65° C. Three hours after the start of polymerization, a polymerization initiator of "Component 3" shown in Table 4 was added, and after 1 hour, a second monomer mixed liquid of "Component 4" shown in Table 4 and an emulsifier aqueous solution of "Component 5" shown in Table 4, and a polymerization initiator of "Component 6" shown in Table 4 were continuously added dropwise into the autoclave over 8 hours. The reaction was performed for 4 hours from the start of the polymerization to obtain rubbery polymer latex (R-1). A rate of polymerization was 95%. A volume average particle size of the polymer particles in this latex was 170 nm, and a value obtained by dividing a volume average particle size (Dv) by the number average particle size (Dn) was (Dv/Dn)=1.05.

TABLE 4

| | Material | Part(s) |
|---|---|---|
| Component 1 | 1,3-butadiene | 19 |
| | Styrene | 1 |
| | t-Dodecyl mercaptan | 0.1 |
| | Isopropylbenzene hydroperoxide | 0.3 |
| | Sodium formaldehyde sulfoxylate | 0.2 |
| | Sodium alkyl diphenyl ether disulfonate (SS-L) | 0.1 |
| | Sodium hydroxide | 0.01 |
| | Deionized water | 146 |
| Component 2 | Ferrous sulfate | 0.0005 |
| | Ethylenediamine tetraacetic acid-disodium salt | 0.0015 |
| | Deionized water | 4 |
| Component 3 | Isopropylbenzene hydroperoxide | 0.1 |
| Component 4 | 1,3-butadiene | 76 |
| | Styrene | 4 |
| | t-Dodecyl mercaptan | 0.4 |
| Component 5 | Sodium alkyl diphenyl ether disulfonate (SS-L) | 1.3 |
| | Sodium formaldehyde sulfoxylate | 0.2 |
| | Deionized water | 29 |
| Component 6 | Isopropylbenzene hydroperoxide | 0.6 |

(2) Production of Graft Polymer (A-8) of Rubber-Containing Graft Polymer 226 parts of latex (R-1) (80 parts as a charged monomer component) were charged into a reaction vessel equipped with a stirrer and a reflux condenser tube, and "Component 1" shown in Table 5 was added thereto. Next, a liquid temperature in the reaction vessel was raised to 55° C., an aqueous solution of "Component 2" shown in Table 5 was added, and then a mixture of "Component 3" shown in Table 5 was added dropwise to the reaction vessel over 60 minutes. Further, the mixture was further heated and stirred for 60 minutes. In this manner, a vinyl monomer was graft-polymerized to the rubbery polymer to obtain rubber-containing graft polymer latex. A rate of polymerization was 98.5%. For sodium alkyldiphenyl ether disulfonate, "PELEX SS-L (trade name, manufactured by KAO Corporation, 50% aqueous solution of sodium alkyldiphenyl ether disulfonate)" was used.

TABLE 5

| | Material | Part(s) |
|---|---|---|
| — | Diene rubber polymer latex | 226 |
| Component 1 | Sodium alkyl diphenyl ether disulfonate | 0.2 |
| Component 2 | Sodium formaldehyde sulfoxylate | 0.08 |
| | Deionized water | 2 |
| Component 3 | Methyl methacrylate | 20 |
| | t-Butyl hydroperoxide | 0.04 |

2.2 parts by mass of the emulsion of a stabilizer were blended with 241.3 parts by mass of the obtained rubber-containing graft polymer latex and mixed. An aqueous solution in which "Component 1" shown in Table 2 was blended was set to 40° C., and the rubber-based graft latex in which the emulsion of a stabilizer was blended with the aqueous solution to form slurry. The slurry was agglomerated by raising the liquid temperature to 70° C. and keeping for 5 minutes. The agglomerate was collected, repeated twice immersing in 1500 parts of deionized water and dehydrating, and dried at 70° C. for 12 hours to obtain a powder of a rubber-containing graft polymer (A-8).

Production Example 9

(1) Production of Silicone-Based Rubbery Polymer Latex (L-1)

"Component 1" shown in Table 6 was mixed to obtain 100 parts of an organosiloxane mixture. "Component 2" shown in Table 6 was added thereto, and the mixture was stirred with a homomixer at 10,000 rpm for 2 minutes, and then passed twice through a homogenizer at a pressure of 20 MPa to obtain a stable premixed emulsion.

Next, the above emulsion was placed in a separable flask with 5 L capacity equipped with a cooling condenser, and then the emulsion was heated to a temperature of 90° C. In a state where the mixture was heated to 90° C., "Component 3" shown in Table 6 was added dropwise for 8 hours to cause a polymerization reaction, and then the mixture was kept for 2 hours. Thereafter, the mixture was cooled to room temperature (25° C.), and the obtained reaction product was kept at room temperature for 6 hours. Then, the reaction solution was neutralized to pH 7.0 by adding a 5% aqueous sodium hydroxide solution to obtain polyorganosiloxane latex (L-1). For sodium dodecylbenzenesulfonate, "NEOPELEX G-15 (trade name, manufactured by KAO Corporation, 16% aqueous solution of sodium dodecylbenzenesulfonate)" was used. For dodecylbenzenesulfonic acid, "NEOPELEX GS (trade name, manufactured by KAO Corporation, dodecylbenzenesulfonic acid)" was used.

A solid content of the polyorganosiloxane latex (L-1) was 17.3%. A weight average particle size (Dw) of this latex measured using a capillary particle size distribution analyzer was 138 nm, the number average particle size (Dn) was 20 nm, and Dw/Dn was 7.1.

TABLE 6

| | Material | Part(s) |
|---|---|---|
| Component 1 | Octamethylcyclotetrasiloxane (manufactured by Momentive Performance Materials, Product name: TSF404) | 98 |
| | γ-methacryloyloxypropyldimethoxymethylsilane | 2 |
| Component 2 | Sodium dodecylbenzenesulfonate | 0.68 |
| | Deionized water | 300 |
| Component 3 | dodecylbenzenesulfonic acid | 2 |
| | sulfonic acid | 0.4 |
| | Deionized water | 92 |

(2) Production of Graft Polymer (S-1) of Rubber-Containing Graft Polymer 3 parts of the polyorganosiloxane latex (L-1) (in terms of solid content) and 161.5 parts of deionized water were charged into a separable flask equipped with a cooling tube, a nitrogen introduction tube, a thermometer, and a stirrer, and subsequently "Component 1" shown in Table 7 was charged thereto. The flask was purged with nitrogen by passing a nitrogen stream through the flask, and the temperature was raised while stirring. One hour after the liquid temperature reached 55° C., one half of the "Component 2" in Table 7 was added to initiate first-stage polymerization. At the time when the polymerization exotherm was confirmed, the remaining half of "Component 2" in Table 7 was added dropwise over 15 minutes, and then kept for 1 hour. Next, "Component 3" and "Component 4" in Table 7 were added dropwise at the same time over 30 minutes. After the completion of the dropwise addition, the mixture was kept for 30 minutes to obtain graft copolymer (S-1) latex.

TABLE 7

|  | Material | Part(s) |
|---|---|---|
| Component 1 | n-Butyl acrylate | 76.24 |
|  | Allyl methacrylate | 0.76 |
|  | Deionized water | 2.00 |
|  | Potassium peroxydisulphate | 0.08 |
| Component 2 | Ferrous sulfate | 0.08 |
|  | Ethylenediamine tetraacetic acid-disodium | 0.33 |
|  | Deionized water | 30 |
| Component 3 | Methyl methacrylate | 20.00 |
| Component 4 | Ferrous sulfate | 0.025 |
|  | Ethylenediamine tetraacetic acid-disodium | 0.15 |
|  | Deionized water | 10 |
| Particle size of rubber polymer latex [nm] |  | 300 |

An aqueous solution in which "Component 1" shown in Table 2 was blended to 320.1 parts by mass of the obtained rubber-containing graft polymer latex was set to 55° C., and the rubber-based graft latex was charged into the aqueous solution to form slurry. The slurry was agglomerated by raising the liquid temperature to 70° C. and keeping for 5 minutes. The agglomerate was collected, repeated twice immersing in 1500 parts of deionized water and dehydrating, and dried at 70° C. for 12 hours to obtain a powder of a rubber-containing graft polymer (S-1).

Production Example 10

(1) Production of Silicone-Based Rubbery Polymer Latex (L-2)

"Component 1" shown in Table 8 was mixed to obtain 100 parts of an organosiloxane mixture. "Component 2" shown in Table 8 was added thereto, and the mixture was stirred with a homomixer at 10,000 rpm for 2 minutes, and then passed twice through a homogenizer at a pressure of 20 MPa to obtain a stable premixed emulsion.

Next, the above emulsion was placed in a separable flask with 5 L capacity equipped with a cooling condenser, and then the emulsion was heated to a temperature of 80° C. A state of the emulsion heated to 85° C. was maintained for 6 hours to cause a polymerization reaction, and then cooled to room temperature (25° C.). The obtained reaction product was kept at room temperature for 6 hours. Thereafter, the reaction solution was neutralized to pH 7.0 by adding a 5% aqueous sodium hydroxide solution to obtain polyorganosiloxane latex (L-2). For sodium dodecylbenzenesulfonate, "NEOPELEX G-15 (trade name, manufactured by KAO Corporation, 16% aqueous solution of sodium dodecylbenzenesulfonate)" was used. For dodecylbenzenesulfonic acid, "NEOPELEX GS (trade name, manufactured by KAO Corporation, dodecylbenzenesulfonic acid)" was used.

A solid content of the polyorganosiloxane latex (L-2) was 28.3%. A weight average particle size (Dw) of this latex measured using a capillary particle size distribution analyzer was 224 nm, the number average particle size (Dn) was 86 nm, and Dw/Dn was 2.60.

TABLE 8

|  | Material | Part(s) |
|---|---|---|
| Component 1 | Cyclic organosiloxane mixture (manufactured by Shin-Etsu Chemical Co., Ltd., Product name: DMC) | 97.5 |
|  | Tetraethoxysilane | 2 |
|  | γ-methacryloyloxypropyldimethoxymethylsilane | 0.5 |
| Component 2 | Sodium dodecylbenzenesulfonate | 0.68 |
|  | dodecylbenzenesulfonic acid | 0.68 |
|  | Deionized water | 200 |

(2) Production of Graft Polymer (S-2) of Rubber-Containing Graft Polymer 4 parts of the polyorganosiloxane latex (L-2) (in terms of solid content) were charged into a separable flask equipped with a cooling tube, a nitrogen introduction tube, a thermometer, and a stirrer, and subsequently "Component 1" in Table 9 was charged thereto.

The flask was purged with nitrogen by passing a nitrogen stream through the flask, and the temperature was raised while stirring. After the liquid temperature reached 45° C., "Component 2" in Table 9 was added to initiate first-stage polymerization. The mixture was kept at 65° C. for 30 minutes from the time when the polymerization exotherm was confirmed.

Next, "Component 3" in Table 9 was added dropwise over 45 minutes to perform second-stage polymerization, and the mixture was kept for 60 minutes from a time point of completion of the dropwise addition. Thereafter, "Component 4" in Table 9 was added dropwise over 20 minutes to perform third-stage polymerization, and the mixture was kept for 60 minutes from the time point of completion of the dropwise addition to obtain a graft copolymer (S-2) latex. For sodium dodecylbenzenesulfonate, "NEOPELEX G-15 (trade name, manufactured by KAO Corporation, 16% aqueous solution of sodium dodecylbenzenesulfonate)" was used.

TABLE 9

|  | Material | Part(s) |
|---|---|---|
| Component 1 | n-Butyl acrylate | 55.44 |
|  | Allyl methacrylate | 0.56 |
|  | Sodium dodecylbenzenesulfonate | 0.53 |
|  | Deionized water | 132.00 |
|  | t-Butyl hydroperoxide | 0.22 |
| Component 2 | Ferrous sulfate | 0.001 |
|  | Ethylenediamine tetraacetic acid-disodium | 0.003 |
|  | Sodium formaldehyde sulfoxylate | 0.2 |
|  | Deionized water | 5 |
| Component 3 | n-Butyl acrylate | 27.72 |
|  | Allyl methacrylate | 0.28 |
|  | t-Butyl hydroperoxide | 0.11 |
| Component 4 | Methyl methacrylate | 10.50 |
|  | n-Butyl acrylate | 0.5 |
|  | t-Butyl hydroperoxide | 0.06 |
| Particle size of rubber polymer latex [nm] |  | 200 |

An aqueous solution in which "Component 1" shown in Table 2 was blended to 252.4 parts by mass of the obtained rubber-containing graft polymer latex was set to 30° C., and the rubber-based graft latex was charged into the aqueous solution to form slurry. The slurry was agglomerated by raising the liquid temperature to 65° C. and keeping for 5 minutes. The agglomerate was collected, repeated twice immersing in 1500 parts of deionized water and dehydrating, and dried at 70° C. for 12 hours to obtain a powder of a rubber-containing graft polymer (S-2).

Measurement 1: Measurement of Acetone-Soluble Component in Rubber-Containing Graft Polymer

[1] Preparation of Dried Sample

A solution formed of 1% by mass of a rubber-containing graft polymer and 99% by mass of acetone is prepared, and the following operations (1) to (4) are performed to obtain a "dry sample".

(1) The solution is centrifuged at 20,000 rpm for 30 minutes.

(2) A supernatant is extracted and placed in a flask.

(3) The flask is set in a constant temperature bath at a temperature of 56° C., and volatile components are distilled off using an evaporator.

(4) A residue in the flask is dried at 120° C. for 3 hours to obtain a "dry sample".

[2] Calculation of Acetone-Insoluble Component

Since the "dry sample" is an acetone soluble component, the acetone-insoluble component is calculated by subtracting the acetone soluble component from the mass of the rubber-containing graft polymer.

Measurement 2: Measurement of Molecular Weight of Acetone-Soluble Component in Rubber-Containing Graft Polymer and Composition Analysis

[1] Measurement of Molecular Weight (1) The acetone soluble component collected in Measurement 1 is dissolved in tetrahydrofuran (THF). (Sample concentration: 0.2 to 0.3% by mass)

(2) Molecular weight distribution (weight average molecular weight: Mw, number average molecular weight: Mn) is measured using gel permeation chromatography (GPC). The standard polymer used for the standard curve was polystyrene, and eluent was THE

[2] Composition Analysis (1) A polymer composition ratio of the acetone soluble component collected in Measurement 1 was measured at a pyrolysis temperature of 500° C., using pyrolysis gas chromatography (GC) or pyrolysis gas chromatography mass spectrometer (GC-MS). An ampoule polymer product was used as a standard polymer for calculation. The composition of the rubbery graft polymer used in the present Examples and Comparative Examples was analyzed by pyrolysis GC-MS, but a component derived from butadiene (such as butadiene dimer) was below the detection limit.

Measurement 3: Measurement of molecular weight of graft chain in diene-based rubber-containing graft polymer and composition analysis

[1] Preparation of Diene-Based Rubber-Containing Graft Sample

A solution formed of 6% by mass of a rubber-containing graft polymer and 94% by mass of THF was prepared, and the following operations (1) and (2) are performed to obtain a "diene-based rubber-containing graft sample".

(1) The solution is centrifuged at 16,000 rpm for 40 minutes by a centrifuge. This centrifugation operation is repeated several times to completely remove a THF soluble component.

(2) A supernatant is discarded, and a THF insoluble component is dried at 80° C. for 4 hours or longer to obtain a "diene-based rubber-containing graft sample".

[2] Ozone Addition Reaction

The "diene-based rubber-containing graft sample" obtained by operations of [1] was subjected to the following operations (1) to (9), and the "graft chain" is separated (isolated) by an ozone addition reaction.

(1) 6% by mass of the "diene-based rubber-containing graft sample" and 94% by mass of 1:1 mixture of chloroform and methylene chloride are prepared to obtain a dispersion solution.

(2) The solution was placed in an ozone absorption bottle and immerse it in a dry ice-methanol solution prepared at −60° C. or lower.

(3) An ozone gas generated from an ozone generator is blown into an absorption bottle to perform ozone addition reaction.

(4) After ozone addition reaction (the absorbing liquid becomes blue), excess ozone is removed by blowing air.

(5) In a beaker, a solution of 10% by mass of a reducing agent (sodium borohydride) and 90% by mass of methanol are adjusted, and stirred with a magnetic stirrer. After dissolution, the absorbing liquid of (4) was placed thereto and stirred for 3 hours or longer.

(6) After stirring, a hydrochloric acid aqueous solution (1:1=hydrochloric acid:water) having a mass equivalent to ⅕ of the mass of the solution (5) is added to the solution of (5), and the mixture is stirred for 3 hours or longer.

(7) After stirring, the mixture is transferred to a separatory funnel to separate two layers. The lower layer is drained into an eggplant flask.

(8) The eggplant flask is set in a constant temperature bath at 65° C. and volatiles are distilled off using an evaporator.

(9) A residue in the egg flask is vacuum dried at 65° C. for 8 hours to obtain a "graft chain dry sample".

[3] Measurement of Molecular Weight of Graft Chain (1) The "graft chain dry sample" is dissolved in THF (tetrahydrofuran).
(Sample concentration: 0.2 to 0.3% by mass)

(2) Molecular weight distribution (weight average molecular weight: Mw, number average molecular weight: Mn) was measured using gel permeation chromatography (GPC). The standard polymer used for the standard curve was polystyrene, and eluent was THF (tetrahydrofuran).

[4] Composition Analysis (1) A polymer composition ratio of the "graft chain dry sample" was measured at a pyrolysis temperature of 500° C., using pyrolysis gas chromatography (GC) or pyrolysis gas chromatography mass spectrometer (GC-MS). An ampoule polymer product was used as a standard polymer for calculation. The composition of the rubbery graft polymer used in the present Examples and Comparative Examples was analyzed by pyrolysis GC-MS, but a component derived from butadiene (such as butadiene dimer) was below the detection limit.

[Measurement of Particle Size]

Measurement was performed using a nano-particle size distribution measuring apparatus SALD-7100 (manufactured by Shimadzu Corporation).

[Measurement of Rate of Polymerization]

The rate of polymerization of the graft latex is measured by the following procedure.

(i) Mass (x) of the aluminum dish is measured to have a unit nearest 0.1 mg.

(ii) Approximately 1 g of polymer (X) latex is placed in an aluminum dish, and the mass (y) of the aluminum dish containing the polymer (X) latex is measured to the nearest 0.1 mg.

(iii) The aluminum dish on which the polymer (X) latex is placed in a dryer at 180° C. and heated for 45 minutes.

(iv) The aluminum dish is removed from the dryer and cooled to room temperature (25° C.) in a desiccator, and mass (z) thereof is measured to have a unit nearest 0.1 mg.

(v) A solid content concentration (%) of the polymer (X) latex is calculated based on the following equation.

Solid content concentration (%)={(z−x)/(y−x)}×100

(vi) A percentage (%) of the solid content concentration calculated by (v) with respect to the solid content concentration at the time of polymerization of all the monomers charged when producing the polymer (X) is set as a rate of polymerization at the time of production completion of graft latex.

Table 10 shows results of the measurement of the acetone insoluble component, the measurement of the molecular weight of the acetone soluble component and the composition analysis, and the measurement of the molecular weight of the graft chain, and the composition analysis of four types of MBS.

MBS-1: Paraloid (paraloid: registered trademark) EXL2691J
MBS-2: KaneAce (registered trademark) M711
MBS-3: KaneAce (registered trademark) M732
MBS-4: METABLEN (registered trademark) E-860A

TABLE 10

| | | Analysis value | | | | | | | | | | |
|---|---|---|---|---|---|---|---|---|---|---|---|---|
| | | Ac insoluble component | Composition and molecular weight of Ac insoluble component [ten thousand] | | | | | Composition and molecular weight after ozonolysis | | | | |
| Abbreviation | Product name | [wt %] | MMA | n-BA | St | Mw | Mn | MMA | n-BA | St | Mw | Mn |
| MBS-1 | EXL2691 | 98 | 81 | 8 | 11 | 1474 | 21 | 46 | | 54 | 2095 | 1431 |
| MBS-2 | M711 | 98 | 95 | 2 | 3 | 11 | 3 | 93 | 7 | | 5 | 2 |
| MBS-3 | M732 | 97 | 83 | | 17 | 12 | 3 | 73 | | 27 | 5 | 1 |
| MBS-4 | E-860A | 94 | 89 | 10 | 1 | 1283 | 382 | 91 | 8 | 1 | 3 | 2 |

In the table, Ac indicates acetone, MMA indicates methyl methacrylate, n-BA indicates n-butyl acrylate, St indicates styrene, Mw indicates mass average molecular weight, and Mn indicates number average molecular weight.

If the graft component has styrene in a large amount, for example, if the amount of the styrene in the acetone soluble component exceeds 10% by mass, difference in the value of methyl methacrylate % by mass in the acetone soluble component obtained from Measurement 2 and the value of methyl methacrylate % by mass of the graft chain obtained from Measurement 3 occurs. However, in a case where the methyl methacrylate in the acetone soluble component is 84% by mass or more, the deviation is small. As a practical sales form in which rubber-containing graft polymers such as MBS are sold, latex formed of high molecular weight non-cross-linked vinyl polymer may be blended with graft latex formed of the rubber-containing graft polymer, in a mass rate of about 2% by mass of polymer solid content, coagulated, and pulverized. These methods are used in practice mainly for improving a blocking property of a powder formed of the rubber-containing graft polymer. Accordingly, there is a possibility that the high molecular weight component of the organic solvent soluble component may be derived from the high molecular weight non-cross-linked vinyl polymer. Therefore, in a case of measuring a practical product containing the rubber-containing graft polymer, if the rubber is derived from butadiene, the organic solvent insoluble component of the product is removed as described in Measurement 3. That is, deriving from the high molecular weight non-cross-linked vinyl polymer is removed and is necessary to perform quantification of the graft chain. In MBS-4, acetone soluble components with a weight average molecular weight of more than 750,000 are detected, but the high molecular weight component is not detected in the composition (="graft chain") after the ozone addition reaction in Measurement 3. This high molecular weight component is considered to be derived from the high molecular weight non-cross-linked vinyl polymer described above, not the graft chain of the present invention.

MBS-4 is classified into two types based on the weight average molecular weight of the acetone soluble component (1,280,000 and 30,000). The weight average molecular weight of the composition (="graft chain") after the ozone addition reaction in Measurement 3 is about 30,000. As the weight average molecular weight of the acetone soluble component, the weight average molecular weight of the graft chain obtained in Measurement 3 can be detected. Particularly, in a system having a high acetone-insoluble component, the influence of being derived from the high molecular weight non-cross-linked vinyl polymer is small and the accuracy is high.

Examples 1 to 5 and Comparative Examples 1 to 7

7.5 parts by mass of the rubber-containing graft polymer (A-1 to A-8, S-1 and S-2, and MBS-1 and MBS-2) obtained in Production Example, 70.0 parts by mass of aromatic polycarbonate (PC; "lupilon S-2000F" (trade name), manufactured by Mitsubishi Engineering-Plastics Corporation, and My of nominal aromatic polycarbonate resin: 22,000), 22.5 parts by mass of styrene acrylonitrile (SAN)-based resin (SAN; "AP-H" (trade name), manufactured by Techno UMG Co., Ltd., a nominal AN ratio of about 26%, and Mw of about 110,000) were blended with and mixed to each other with a composition shown in Table 11 to obtain a mixture. This mixture was supplied to a devolatilizing biaxial extruder (manufactured by Ikegai Iron Works Co., Ltd., PCM-30) heated to a barrel temperature of 260° C. and kneaded, and pellets of the resin compositions of Examples 1 to 5 and Comparative Examples 1 to 7, which are aromatic polycarbonate alloys in which 22.5% by mass of the SAN resin and 7.5% by mass of the rubber-containing graft polymer were blended were produced.

TABLE 11

|  |  | Example | | | | | Comparative Example | | | | | | |
|---|---|---|---|---|---|---|---|---|---|---|---|---|---|
|  |  | 1 | 2 | 3 | 4 | 5 | 1 | 2 | 3 | 4 | 5 | 6 | 7 |
| PC |  | 70.0 | 70.0 | 70.0 | 70.0 | 70.0 | 70.0 | 70.0 | 70.0 | 70.0 | 70.0 | 70.0 | 70.0 |
| SAN |  | 22.5 | 22.5 | 22.5 | 22.5 | 22.5 | 22.5 | 22.5 | 22.5 | 22.5 | 22.5 | 22.5 | 22.5 |
| Rubber containing graft polymer | A-1 | 7.5 |  |  |  |  |  |  |  |  |  |  |  |
|  | A-2 |  | 7.5 |  |  |  |  |  |  |  |  |  |  |
|  | A-3 |  |  | 7.5 |  |  |  |  |  |  |  |  |  |
|  | A-4 |  |  |  | 7.5 |  |  |  |  |  |  |  |  |
|  | S-1 |  |  |  |  | 7.5 |  |  |  |  |  |  |  |
|  | A-5 |  |  |  |  |  | 7.5 |  |  |  |  |  |  |
|  | A-6 |  |  |  |  |  |  | 7.5 |  |  |  |  |  |
|  | A-7 |  |  |  |  |  |  |  | 7.5 |  |  |  |  |
|  | A-8 |  |  |  |  |  |  |  |  | 7.5 |  |  |  |
|  | MBS-1 |  |  |  |  |  |  |  |  |  | 7.5 |  |  |
|  | MBS-2 |  |  |  |  |  |  |  |  |  |  | 7.5 |  |
|  | S-2 |  |  |  |  |  |  |  |  |  |  |  | 7.5 |

[Charpy Impact Test]

Pellets of the resin composition of each Example or each Comparative Example obtained above were supplied to sumitomo injection molding machine SE100DU (manufactured by Sumitomo Heavy Industries, Ltd.), and a shaped article (test piece) having a length of 80 mm×a width of 10 mm×a thickness of 4 mm was obtained at a cylinder temperature of 260° C. and a mold temperature of 60° C. A Charpy impact test was performed in accordance with ISO-179-1 and measurement was performed by cutting a TYPEA notch in accordance with ISO 2818. Measurement results were shown in Table 12.

[Weld Strength]

Pellets of the resin composition of each Example or each Comparative Example obtained above were supplied to sumitomo injection molding machine SE100DU (manufactured by Sumitomo Heavy Industries, Ltd.), a multipurpose test piece (A1) determined by JIS-7139 was obtained at a cylinder temperature of 260° C. and a mold temperature of 60° C.

Test pieces were prepared under the following three conditions.

3-a) Prepared with one point gate 3-b) Prepared with two-point gate so that a weld line is at the center of the test piece (a in FIG. 1)

3-c) Reduce holding pressure at the time of injection molding to adjust so that shapes shown in a, b, and c in FIG. 1 are obtained.

TABLE 12

|  |  |  | Example | | | | | Comparative Example | | | | | | |
|---|---|---|---|---|---|---|---|---|---|---|---|---|---|
|  |  |  | 1 A-1 | 2 A-2 | 3 A-3 | 4 A-4 | 5 S-1 | 1 A-5 | 2 A-6 | 3 A-7 | 4 A-8 | 5 MBS-1 | 6 MBS-2 | 7 S-2 |
| Rubber-containing graft polymer | Particle size of rubber (nm) |  | 200 | 200 | 200 | 200 | 300 | 200 | 370 | 200 | 170 | 200 | 190 | 210 |
|  | BA amount of graft (% by mass) |  | 0 |  |  | 5 |  | 10 |  |  |  |  |  | 5 |
|  | organic solvent insoluble component (% by mass) |  | 95 | 95 | 94 | 95 | 97 | 96 | 72 | 89 | 96 | 98 | 98 | 94 |
|  | weight average molecular weight of organic solvent soluble component (Mw) |  | 52 | 36 | 47 | 45 | 43 | 44 | 35 | 9 | 3 | 1504 | 11 | 12 |
|  | Rate of MMA-derived organic solvent soluble component (% by mass) |  | 88 | 88 | 85 | 84 | 88 | 83 | 80 | 89 | 100 | 81 | 95 | 85 |
|  | Rate of MMA-derived organic solvent soluble component after freeze-grinding (% by mass) |  | 48 |  |  | 46 | 44 | 40 |  | 28 |  |  |  | 37 |
|  | Rate of component in which integral molecular weight distribution of organic solvent soluble component after freeze-grinding is 300,000 or more |  | 16 |  |  | 16 | 12 | 16 |  | 5 |  |  |  | 8 |
| Resin composition | Charpy impact test | 23° C. | 59 | 58 | 60 | 56 | 90 | 59 | 54 | 64 | 54 | 49 | 48 | 85 |
|  |  | 0° C. | 56 | 57 | 58 | 46 | 59 | 36 | 30 | 26 | 50 | 45 | 46 | 27 |
|  | Tensile property (one point gate) | Yield strength [MPa] | 57 | 57 | 58 | 56 | 53 | 56 | 56 | 55 | 54 | 61 | 55 | 52 |
|  | Weld strength | Two-point gate (FIG. a) | 53 | 53 | 58 | 55 | 51 | 55 | 44 | 46 | 48 | 49 | 47 | 44 |
|  |  | Two-point gate (FIG. c) | 51 | 52 | 54 | 49 | 45 | 49 | 36 | 43 | 40 | 49 | 42 | 40 |
|  | Two-point gate (a in FIG. 1) shaping condition | Injection pressure [MPa] | 22.0 | 22.0 | 22.0 | 22.5 | 23.6 | 22.5 | 23.5 | 22.0 | 23.5 | 25.0 | 25.5 | 20.2 |
|  |  | Holding pressure A [MPa] | 23.5 | 21 | 23.2 | 14.2 | 9 | 14.2 | 14.5 | 21 | 14.5 | 21.5 | 20.8 | 8.4 |
|  | Two-point gate (c in FIG. 1) shaping condition | Injection pressure [MPa] | 22.0 | 22.0 | 22.0 | 22.5 | 23.6 | 22.5 | 22.5 | 22.0 | 23.5 | 25.0 | 25.5 | 20.2 |
|  |  | Holding pressure C [MPa] | 19.5 | 17 | 19.2 | 10.2 | 5 | 10.2 | 10.2 | 17.5 | 10.5 | 17.5 | 16.8 | 4.4 |

A tensile test was in accordance with ISO-527, and tensile speed was set to 20 mm/min. A weld strength in an evaluation of the present invention is defined as a yield strength of the tensile test (a breaking strength when no yield point appears).

[TEM Observation of Shaped Product]

Figure 2:
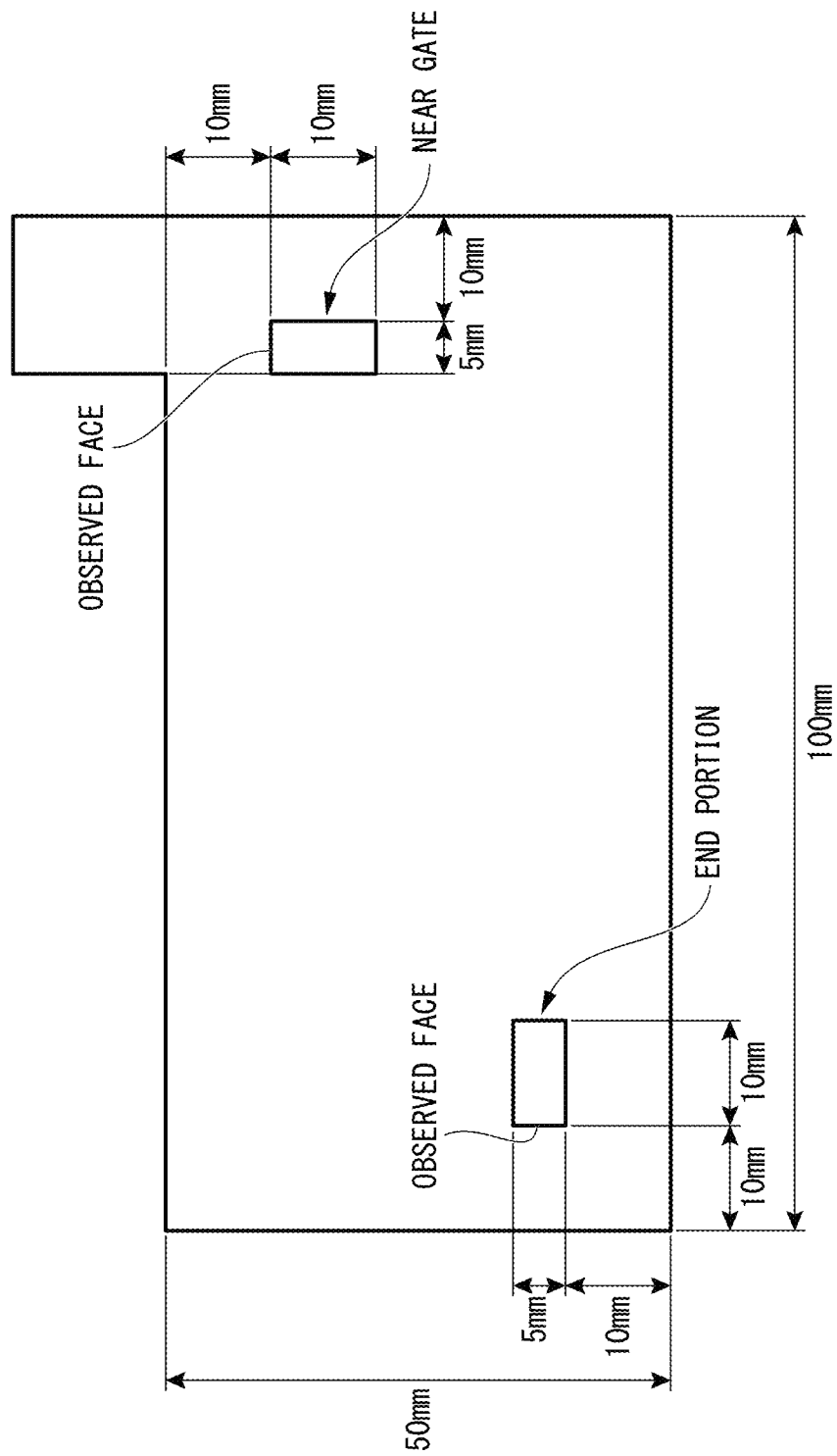
FIG. 2 is a schematic diagram showing an observation surface in TEM observation of a shaped product obtained from pellets of the resin composition of each example or each comparative example.

Pellets of the resin composition of each Example or each Comparative Example obtained above were supplied to sumitomo injection molding machine SE100DU (manufactured by Sumitomo Heavy Industries, Ltd.), and a shaped article (test piece) having a length of 100 mm×a width of 50 mm×a thickness of 2 mm was obtained at a cylinder temperature of 260° C. and a mold temperature of 60° C. From the test piece, a specimen having a length of 10 mm, a width of 5 mm and a thickness of 2 mm was cut out from the vicinity of an injection gate and the vicinity of an end as shown in FIG. 2. The cut specimen was surfaced and trimmed with an ultramicrotome (product name: Leica EM UC7, manufactured by Leica Microsystems Co., Ltd.) so that a section near the center was a thin section in the section described as the observation surface in FIG. 2. The obtained specimen was dyed with 0.5% by mass Ruthenium tetroxide aqueous solution (manufactured by Nissin EM Co., Ltd.) vapor at 25° C. for 12 hours, and then a flake was cut out using the ultramicrotome under the conditions of a thin section thickness of 50 nm and cutting speed of 0.4 mm/sec and collected on a copper grid with a supporting film. Observation was performed with a transmission electron microscope (product name: H-7600, manufactured by Hitachi, Ltd.) under a condition of an acceleration voltage of 80 kV.

The difference between the rubber-containing graft polymer (A-7) used in Comparative Example 3 and the rubber-containing graft polymer (A-1) in Example 1 was mainly whether or not graft polymerization was performed by a redox reaction of an iron compound and whether or not the rubbery polymer contains styrene. In (A-1), the weight average molecular weight of the acetone soluble component is higher and there are more acetone-insoluble components, compared to (A-7). In addition, based on the fact that the methyl methacrylate rate in the acetone soluble component is 88% and the findings in Table 12, it can be considered that the graft chain of the rubber-containing graft polymer (A-1) is almost the same as the molecular weight and the composition obtained from the acetone soluble component.

The rubber-containing graft polymer (A-1) of the present invention has higher impact strength and weld strength than those of the rubber-containing graft polymer (A-7).

Further, in a material extracted with an organic solvent from an organic solvent insoluble component obtained by freeze-grinding an organic solvent insoluble component of the rubber-containing graft polymer, in (A-1), a content of a methyl methacrylate was 43% or more, and a content of a component having a styrene-equivalent molecular weight of 300,000 or more determined by integral molecular weight distribution was 10% or more.

Figure 3:
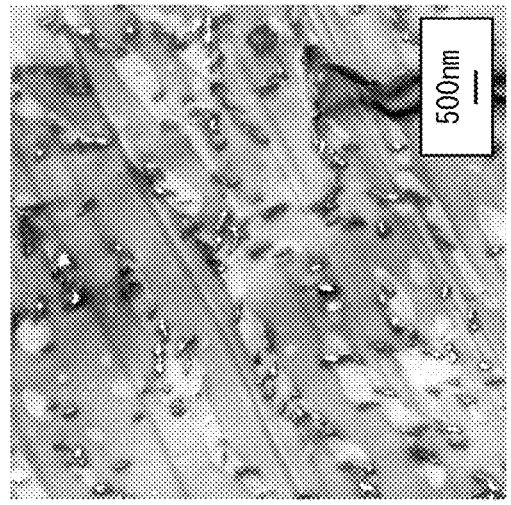
FIG. 3 is a TEM photograph showing results of TEM observation of shaped products obtained in Example 1 and Comparative Example 3.
Figure 3:
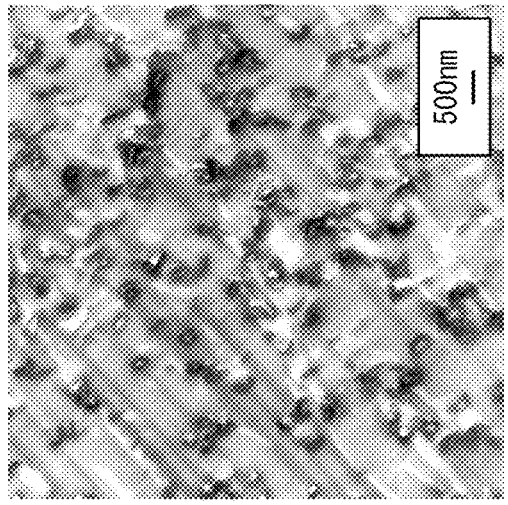
Figure 3:
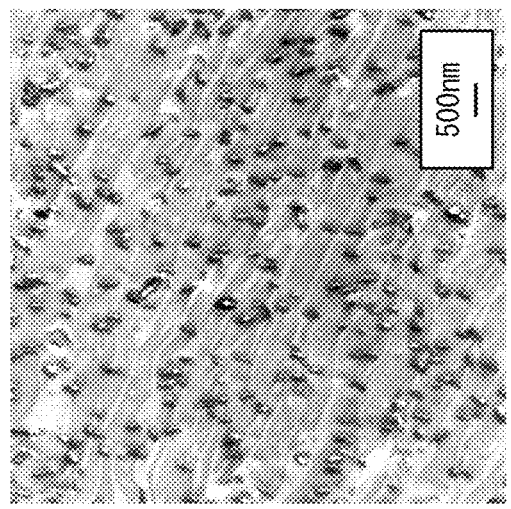
Figure 3:
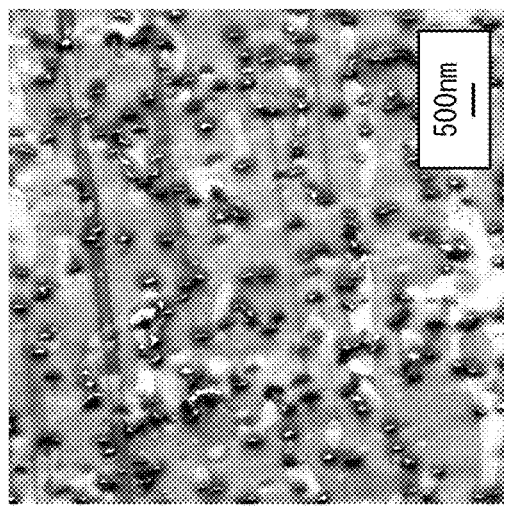

In FIG. 3, results of TEM observation of resins respectively obtained in Example 1 and Comparative Example 3 were summarized. A phase morphology in which sea is an aromatic polycarbonate and an island is a SAN resin is shown, and it shows in which phase the circular rubber is located. The rubber derived from the rubber-containing graft polymer (A-1) in the resin composition obtained in Example 1 is uniformly dispersed in the aromatic polycarbonate alloy. In addition, since the phase separation derived from the SAN resin is also finely and uniformly dispersed, it is considered that the impact strength is also high. Factors that reduce the weld strength are mainly due to non-uniform phase separation derived from the SAN resin in the weld and poor rubber dispersion. In order to improve the impact strength, a gap between rubber and rubber required to be narrow. In other words, it is required both that the rubber is uniformly dispersed and that a cavity is formed in the rubber when an impact is applied and the formation of craze of a matrix resin is promoted. The particle size is required to be 100 to 300 nm.

Figure 4:
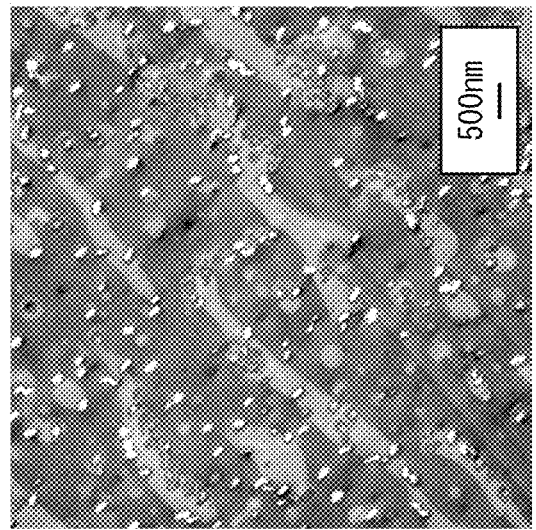
FIG. 4 is a TEM photograph showing results of TEM observation of shaped products obtained in Example 1 and Comparative Example 1.
Figure 4:
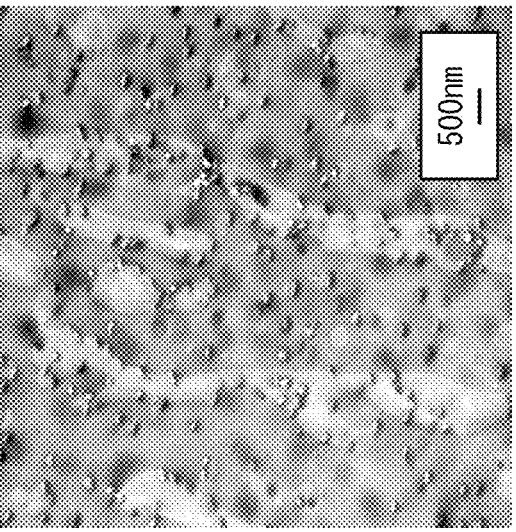

The difference between Example 4 and Comparative Example 1 is the methyl methacrylate % by mass of the graft component. In FIG. 4, results of TEM observation of resins respectively obtained in Example 1 and Comparative Example 1 were summarized. When the methyl methacrylate % by mass of the graft component is below 95% by mass, the rubber is biased toward phase separation derived from the SAN resin, and the uniform dispersion of the rubber is impaired. For this reason, it is considered that the impact strength at low temperature decreased.

Butadiene-based rubber has a higher Poisson's ratio than in acrylic rubber. For this reason, the butadiene-based rubber has better impact strength even at room temperature than in the acrylic rubber. The acrylic rubber has a higher glass transition temperature than that of butadiene-based, and at a low temperature (for example, 0° C.), the impact strength developability decreases. However, even with the butadiene-based rubber, if the weight average molecular weight of the organic solvent soluble component of the rubber-containing graft polymer is not in the range of 250,000 to 700,000, the impact strength is not sufficient. Particularly, in a case of a matrix resin formed of two or more kinds of resins such as an alloy, a remarkable difference is exhibited. In MBS-1 of Comparative Example 5, since the weight average molecular weight of the organic solvent soluble component of the rubber-containing graft polymer was not in the range of 250,000 to 700,000, the results were inferior to the acrylic rubber of Examples 1 to 5. In Comparative Examples 4 and 6, the diene-based rubber-containing graft polymers in which the weight average molecular weight of the organic solvent soluble component of the rubber-containing graft polymer was not in the range of 250,000 to 700,000 were used. However, the impact strength and weld strength are inferior to the acrylic rubber-containing graft polymers of Examples 1 to 3.

Regarding the silicone acrylic rubber, the difference between the rubber-containing graft polymer (S-2) used in Comparative Example 7 and the rubber-containing graft polymer (S-1) in Example 5 was mainly whether or not graft polymerization was performed by a redox reaction of an iron compound. In rubber-containing graft polymer (S-1), the weight average molecular weight of the acetone soluble component is higher and there are more acetone-insoluble components, compared to the rubber-containing graft polymer (S-2). In addition, based on the fact that the methyl methacrylate rate in the acetone soluble component is 84% or more and the findings in Table 12, it can be considered that the graft chain of the rubber-containing graft polymer (S-1) is almost the same as the molecular weight and the composition obtained from the acetone soluble component. The rubber-containing graft polymer (S-1) in which the weight average molecular weight of the organic solvent soluble component of the rubber-containing graft polymer is in the range of 250,000 to 700,000, has higher impact strength, tensile properties (one-point gate), and weld strength, than those of the rubber-containing graft polymer (S-2) in which the weight average molecular weight of the organic solvent soluble component of the rubber-containing graft polymer is not in the range of 250,000 to 700,000. Further, in a material extracted with an organic solvent from an organic solvent insoluble component obtained by freeze-grinding an organic solvent insoluble component of the rubber-containing graft polymer, in the rubber-containing graft polymer (S-1), a content of methyl methacrylate was 43% or more, and a content of a component having a styrene-equivalent molecular weight of 300,000 or more determined by integral molecular weight distribution was 10% or more.

Example 6

The rubber-containing graft polymer (A-1) obtained in Production Example 1 and polybutylene terephthalate (PBT; "Novaduran 5010R5" (trade name), manufactured by Mitsubishi Engineering-Plastics Corporation) were blended with each other with a composition shown in Table 13, and mixed to obtain a mixture. This mixture was supplied to a devolatilizing biaxial extruder (manufactured by Ikegai Iron Works Co., Ltd., PCM-30) heated to a barrel temperature of 260° C. and kneaded, and pellets of the resin composition of Example 6, which is polybutylene terephthalate in which 15% by mass of the rubber-containing graft polymer (A-1) were blended were produced.

Comparative Example 8

Except that the rubber-containing graft polymer (A-7) was used in place of the rubber-containing graft polymer (A-1), pellets of the resin composition of Comparative Example 8 were produced in the same manner as in Example 6. Table 13 shows results of the Charpy impact test.

TABLE 13

|  |  | Example 6 | Comparative Example 8 |
|---|---|---|---|
| Blending | PBT | 85 | 85 |
|  | Rubber-containing graft polymer (A-1) | 15 |  |
|  | Rubber-containing graft polymer (A-7) |  | 15 |
| Property | Charpy impact test | 9 | 7 |

The difference between the rubber-containing graft polymer (A-7) used in Comparative Example 8 and the rubber-containing graft polymer (A-1) used in Example 6 was mainly whether or not graft polymerization was performed by a redox reaction of an iron compound and whether or not the rubbery polymer contains styrene. A significant difference in strength developability was also observed in the polybutylene terephthalate-based.

The invention claimed is:

1. A rubber-containing graft polymer,
   wherein a rubber to be grafted has a particle size of 100 to 300 nm,
   a content of an organic solvent insoluble component in the rubber-containing graft polymer (100% by mass) is 92% to 99.5% by mass, and
   an organic solvent soluble component of the rubber-containing graft polymer has a weight average molecular weight of 250,000 to 700,000.

2. The rubber-containing graft polymer according to claim 1,
   wherein a content of a methyl methacrylate-derived product in the organic solvent soluble component (100% by mass) of the rubber-containing graft polymer is 84% by mass or more.

3. A rubber-containing graft polymer having,
   a content of a methyl methacrylate-derived product of 43% or higher grafted to the rubber-containing graft polymer, and
   a content of an organic solvent soluble component with a styrene-equivalent molecular weight of 300,000 or more determined by integral molecular weight distribution of 10% or higher obtainable by freeze-grinding an organic solvent insoluble component of the rubber-containing graft polymer.

4. A rubber-containing graft polymer, which is obtainable by polymerizing, using a persulfate, a vinyl monomer for grafting containing 95% by mass or more of methyl methacrylate to rubber latex with a volume average particle size of 100 to 300 nm, which is obtainable by polymerizing, using a persulfate, 0.5 to 3.0 parts by mass of an aromatic vinyl monomer containing 100 parts by mass of acrylate (a1) and 0.1 to 0.7 parts by mass of allyl methacrylate (a2), or before polymerizing the vinyl monomer for grafting containing 95% by mass or more of the methyl methacrylate.

5. A resin composition containing a rubber-containing graft polymer, comprising:
   the rubber-containing graft polymer according to claim 1; and
   a thermoplastic resin (B).

6. The resin composition containing a rubber-containing graft polymer according to claim 5,
   wherein the thermoplastic resin (B) comprises an aromatic polycarbonate (b1).

7. The resin composition containing a rubber-containing graft polymer according to claim 5,
   wherein the thermoplastic resin (B) comprises a styrene-based resin (b2).

8. The resin composition containing a rubber-containing graft polymer according to claim 5,
   wherein the thermoplastic resin (B) comprises polyester (b3).

9. A shaped article obtained by shaping the resin composition containing a rubber-containing graft polymer according to claim 5.

10. The shaped article according to claim 9, which is an injection molded article.

11. The rubber-containing graft polymer according to claim 1, wherein the organic solvent insoluble components are components of (Rg+R0) derived from the rubber cross-linking component, wherein:
    Rg is a rubber cross-linking component and graft chain derived from vinyl monomer chemically bonding thereto; and
    R0 is a non-grafted rubber cross-linking component.

12. The rubber-containing graft polymer according to claim 1, wherein the rubber-containing graft polymer comprises:
    a rubber cross-linking component and graft chain derived from vinyl monomer chemically bonding thereto;
    a non-grafted rubber cross-linking component;
    a non-gross-linking rubber component and graft chain derived from vinyl monomer chemically bonding thereto; and
    a non-grafted rubber non-cross-linking component.

13. The rubber-containing graft polymer according to claim 1, wherein the rubber-containing graft polymer has a graft chain with length of 250,000 to 700,000 in terms of a weight average molecular weight.

14. The rubber-containing graft polymer according to claim 1, wherein a content of a methyl methacrylate-derived product in the graft chain is 84% by mass or more.

* * * * *